United States Patent
Hao et al.

(10) Patent No.: US 9,544,598 B2
(45) Date of Patent: Jan. 10, 2017

(54) METHODS AND APPARATUS FOR PRUNING DECISION OPTIMIZATION IN EXAMPLE-BASED DATA PRUNING COMPRESSION

(75) Inventors: Qiang Hao, Morgantown, VA (US); Dong-Qing Zhang, Bridgewater, NJ (US)

(73) Assignee: THOMSON LICENSING, Issy les Moulineaux (FR)

( * ) Notice: Subject to any disclaimer, the term of this patent is extended or adjusted under 35 U.S.C. 154(b) by 576 days.

(21) Appl. No.: 13/821,393

(22) PCT Filed: Sep. 9, 2011

(86) PCT No.: PCT/US2011/050925
§ 371 (c)(1),
(2), (4) Date: Mar. 7, 2013

(87) PCT Pub. No.: WO2012/033972
PCT Pub. Date: Mar. 15, 2012

(65) Prior Publication Data
US 2013/0170544 A1    Jul. 4, 2013

Related U.S. Application Data

(60) Provisional application No. 61/403,109, filed on Sep. 10, 2010.

(51) Int. Cl.
*H04N 19/19* (2014.01)
*H04N 19/00* (2014.01)
(Continued)

(52) U.S. Cl.
CPC ...... *H04N 19/00903* (2013.01); *H04N 19/132* (2014.11); *H04N 19/147* (2014.11);
(Continued)

(58) Field of Classification Search
None
See application file for complete search history.

(56) References Cited

U.S. PATENT DOCUMENTS

| 5,446,806 A | 8/1995 | Ran et al. |
| 5,537,155 A | 7/1996 | O'Connell et al. |

(Continued)

FOREIGN PATENT DOCUMENTS

| CN | 1128097 | 7/1996 |
| CN | 1276946 | 12/2000 |

(Continued)

OTHER PUBLICATIONS

Symes, "Digital Video Compression," McGraw-Hill, 2004, ISBN 0-07-142487, pp. 116-121 and 242-243.*

(Continued)

*Primary Examiner* — Reza Aghevli
(74) *Attorney, Agent, or Firm* — Tutunjian & Bitetto, P.C.

(57) ABSTRACT

An apparatus includes a patch library creator for creating a first patch library from an original version of the picture and a second patch library from a reconstructed version of the picture. Each of the libraries includes a plurality of high resolution replacement patches for replacing one or more pruned blocks during a recovery of a pruned version of the picture. A pruner generates the pruned version from the first patch library, and decides whether to respectively replace original blocks with pruned blocks responsive to a comparison between a first rate-distortion estimate and a second rate-distortion estimate. The estimates are based on both a distortion component and a bitrate component. A metadata generator generates metadata from the second patch library. The metadata is for recovering the pruned version. An encoder encodes the pruned version and the metadata.

16 Claims, 24 Drawing Sheets

(51) Int. Cl.
| | |
|---|---|
| *H04N 19/85* | (2014.01) |
| *H04N 19/59* | (2014.01) |
| *H04N 19/176* | (2014.01) |
| *H04N 19/147* | (2014.01) |
| *H04N 19/46* | (2014.01) |
| *H04N 19/132* | (2014.01) |

(52) U.S. Cl.
CPC .......... *H04N 19/176* (2014.11); *H04N 19/19* (2014.11); *H04N 19/46* (2014.11); *H04N 19/59* (2014.11); *H04N 19/85* (2014.11)

(56) References Cited

U.S. PATENT DOCUMENTS

| | | | |
|---|---|---|---|
| 5,557,684 | A | 9/1996 | Wang et al. |
| 5,754,236 | A | 5/1998 | Lee |
| 5,764,374 | A | 6/1998 | Seroussi et al. |
| 5,768,434 | A | 6/1998 | Ran |
| 5,784,491 | A | 7/1998 | Koga |
| 5,822,465 | A | 10/1998 | Normile et al. |
| 5,862,342 | A | 1/1999 | Winter et al. |
| 6,043,838 | A | 3/2000 | Chen |
| 6,173,089 | B1 | 1/2001 | Van Lerberghe |
| 6,278,446 | B1 | 8/2001 | Liou et al. |
| 6,397,166 | B1 | 5/2002 | Leung et al. |
| 6,526,183 | B1 | 2/2003 | Bonnet et al. |
| 6,795,578 | B1 | 9/2004 | Kotani et al. |
| 6,798,834 | B1 | 9/2004 | Murakami et al. |
| 7,386,049 | B2 | 6/2008 | Garrido et al. |
| 7,433,526 | B2* | 10/2008 | Apostolopoulos et al. .. 382/239 |
| 7,447,337 | B2 | 11/2008 | Zhang et al. |
| 7,623,706 | B1 | 11/2009 | Maurer |
| 7,643,690 | B2 | 1/2010 | Suzuki et al. |
| 7,671,894 | B2 | 3/2010 | Yea et al. |
| 7,715,658 | B2* | 5/2010 | Cho et al. ................ 382/299 |
| 8,340,463 | B1 | 12/2012 | Cho et al. |
| 8,831,107 | B2 | 9/2014 | Zheng et al. |
| 9,031,130 | B2 | 5/2015 | Suzuki et al. |
| 2001/0055340 | A1 | 12/2001 | Kim et al. |
| 2002/0009230 | A1 | 1/2002 | Sun et al. |
| 2002/0036705 | A1 | 3/2002 | Lee et al. |
| 2002/0172434 | A1 | 11/2002 | Freeman et al. |
| 2003/0005258 | A1 | 1/2003 | Modha et al. |
| 2003/0021343 | A1 | 1/2003 | Trovato |
| 2003/0058943 | A1 | 3/2003 | Zakhor et al. |
| 2004/0001705 | A1 | 1/2004 | Soupliotis et al. |
| 2004/0017852 | A1 | 1/2004 | Garrido et al. |
| 2004/0170330 | A1 | 9/2004 | Fogg |
| 2004/0213345 | A1 | 10/2004 | Holcomb et al. |
| 2004/0218834 | A1 | 11/2004 | Bishop et al. |
| 2004/0258148 | A1 | 12/2004 | Kerbiriou et al. |
| 2005/0015259 | A1 | 1/2005 | Thumpudi et al. |
| 2005/0019000 | A1 | 1/2005 | Lim et al. |
| 2005/0225553 | A1 | 10/2005 | Chi |
| 2005/0243921 | A1 | 11/2005 | Au et al. |
| 2006/0013303 | A1 | 1/2006 | Nguyen et al. |
| 2006/0039617 | A1 | 2/2006 | Makai et al. |
| 2006/0088191 | A1 | 4/2006 | Zhang et al. |
| 2006/0126960 | A1 | 6/2006 | Zhou et al. |
| 2006/0239345 | A1 | 10/2006 | Taubman |
| 2006/0245502 | A1 | 11/2006 | Cheng et al. |
| 2006/0269149 | A1 | 11/2006 | Song |
| 2007/0014354 | A1 | 1/2007 | Murakami et al. |
| 2007/0041663 | A1 | 2/2007 | Cho et al. |
| 2007/0118376 | A1 | 5/2007 | Mukerjee |
| 2007/0223808 | A1 | 9/2007 | Kerr |
| 2007/0223825 | A1 | 9/2007 | Ye et al. |
| 2007/0248272 | A1 | 10/2007 | Sun et al. |
| 2008/0107346 | A1 | 5/2008 | Zhang et al. |
| 2008/0117975 | A1 | 5/2008 | Sasai et al. |
| 2008/0131000 | A1 | 6/2008 | Tsai et al. |
| 2008/0152243 | A1 | 6/2008 | Min et al. |
| 2008/0159401 | A1 | 7/2008 | Lee et al. |
| 2008/0172379 | A1 | 7/2008 | Uehara et al. |
| 2008/0187305 | A1 | 8/2008 | Raskar et al. |
| 2009/0002379 | A1* | 1/2009 | Baeza et al. ................ 345/522 |
| 2009/0003443 | A1 | 1/2009 | Guo et al. |
| 2009/0041367 | A1 | 2/2009 | Mansour |
| 2009/0080804 | A1 | 3/2009 | Hamada et al. |
| 2009/0097564 | A1* | 4/2009 | Chen et al. ............. 375/240.17 |
| 2009/0097756 | A1 | 4/2009 | Kato |
| 2009/0116759 | A1 | 5/2009 | Suzuki et al. |
| 2009/0175538 | A1 | 7/2009 | Bronstein et al. |
| 2009/0180538 | A1 | 7/2009 | Visharam et al. |
| 2009/0185747 | A1 | 7/2009 | Segall et al. |
| 2009/0196350 | A1 | 8/2009 | Xiong |
| 2009/0232215 | A1 | 9/2009 | Park et al. |
| 2009/0245587 | A1* | 10/2009 | Holcomb et al. ............ 382/108 |
| 2009/0252431 | A1* | 10/2009 | Lu et al. ....................... 382/255 |
| 2009/0274377 | A1 | 11/2009 | Kweon et al. |
| 2010/0046845 | A1 | 2/2010 | Wedi et al. |
| 2010/0074549 | A1 | 3/2010 | Zhang et al. |
| 2010/0091846 | A1 | 4/2010 | Suzuki et al. |
| 2010/0104184 | A1* | 4/2010 | Bronstein et al. ............ 382/170 |
| 2010/0150394 | A1 | 6/2010 | Bloom et al. |
| 2010/0196721 | A1* | 8/2010 | Ogawa ........................ 428/426 |
| 2010/0208814 | A1 | 8/2010 | Xiong et al. |
| 2010/0272184 | A1 | 10/2010 | Fishbain et al. |
| 2011/0007800 | A1 | 1/2011 | Zheng et al. |
| 2011/0047163 | A1 | 2/2011 | Chechik et al. |
| 2011/0142330 | A1 | 6/2011 | Min et al. |
| 2011/0170615 | A1 | 7/2011 | Vo et al. |
| 2011/0210960 | A1 | 9/2011 | Touma et al. |
| 2011/0261886 | A1 | 10/2011 | Suzuki et al. |
| 2012/0106862 | A1 | 5/2012 | Sato |
| 2012/0155766 | A1 | 6/2012 | Zhang et al. |
| 2012/0201475 | A1 | 8/2012 | Carmel et al. |
| 2012/0320983 | A1 | 12/2012 | Zheng et al. |
| 2013/0163676 | A1 | 6/2013 | Zhang et al. |
| 2013/0163679 | A1 | 6/2013 | Zhang et al. |
| 2013/0170746 | A1 | 7/2013 | Zhang et al. |
| 2014/0036054 | A1 | 2/2014 | Zouridakis |
| 2014/0056518 | A1 | 2/2014 | Yano et al. |

FOREIGN PATENT DOCUMENTS

| | | |
|---|---|---|
| CN | 1495636 | 5/2004 |
| CN | 1777287 | 5/2006 |
| CN | 1863272 | 11/2006 |
| CN | 101048799 | 10/2007 |
| CN | 101198064 | 6/2008 |
| CN | 101389021 | 3/2009 |
| CN | 101459842 | 6/2009 |
| CN | 101551903 | 10/2009 |
| CN | 101556690 | 10/2009 |
| EP | 1401211 | 3/2004 |
| EP | 1659532 | 5/2006 |
| FR | 2941581 | 7/2010 |
| JP | 3027670 | 2/1991 |
| JP | 7222145 | 8/1995 |
| JP | 7231444 | 8/1995 |
| JP | 8502865 | 3/1996 |
| JP | 8336134 | 12/1996 |
| JP | 2000215318 | 8/2000 |
| JP | 2003018398 | 1/2003 |
| JP | 2004222218 | 8/2004 |
| JP | 2004266794 | 9/2004 |
| JP | 200520761 | 1/2005 |
| JP | 2006203744 | 8/2006 |
| JP | 2006519533 | 8/2006 |
| JP | 2008289005 | 11/2008 |
| JP | 200977189 | 4/2009 |
| JP | 2009267710 | 11/2009 |
| JP | 2010514325 | 4/2010 |
| JP | 2011501542 | 1/2011 |
| KR | 0169662 | 10/1998 |
| WO | WO9406099 | 3/1994 |
| WO | WO9819450 | 7/1998 |
| WO | WO03084238 | 10/2003 |
| WO | WO03102868 | 12/2003 |
| WO | WO2005043882 | 5/2005 |
| WO | WO2006025339 | 3/2006 |
| WO | WO2007111966 | 10/2007 |
| WO | WO2008066025 | 6/2008 |

(56) References Cited

FOREIGN PATENT DOCUMENTS

| WO | WO2009052742 | 4/2009 |
|---|---|---|
| WO | WO2009087641 | 7/2009 |
| WO | WO2009094036 | 7/2009 |
| WO | WO2009157904 | 12/2009 |
| WO | WO2010033151 | 3/2010 |
| WO | WO2011090798 | 7/2011 |

OTHER PUBLICATIONS

Barreto et al., "Region-Based Super-Resolution for Compression," Multidemensional Systems and Signal Processing, Kluwer, Amsterdam, NL, Mar. 8, 2007, vol. 18, No. 2-3, pp. 59-81.
Black et al., "The Robust Estimation of Multiple Motions: Parametric and Piecewise-Smooth Flow Fields," Computer Vision and Image Understanding, vol. 63. No. 1, Jan. 1996, pp. 75-104, Academic Press, Orlando, FL, USA.
Fischler et al., "Random Sample Consensus: A Paradigm for Model Fitting with Applications to Image Analysis and Automated Cartography," Communications of the ACM, vol. 24, No. 6. Jun. 1981, pp. 381-395, ACM Press, NY, NY, USA. 4.
Park et al., "Super-Resolution Image Reconstruction: A Technical Overview," IEEE Signal Processing Magazine, vol. 20, No. 3, May 2003, pp. 21-36.
Torr et al., "MLESAC: A New Robust Estimator with Application to Estimating Image Geometry," Computer Vision and Image Understanding, vol. 78, No. 1, Apr. 2000, pp. 138-156, Academic Press, Orlando, FL, USA.
Cheng et al., "Reduced Resolution Residual Coding for H.264-based Compression System," Proceedings of the 2006 IEEE Int'l. Symposium on Circuits and Systems (ISCAS 2006), May 21, 2006, pp. 3486-3489.
Moffat et al., "Chapter 3. Static Codes," Compression and Coding Algorithms, Feb. 2002, pp. 29-50.
Zhang et al., "A Pattern-based Lossy Compression Scheme for Document Images," Electronic Publishing, vol. 8, No. 2-3, Sep. 24, 1995, pp. 221-233.
Bishop et al., "Super-resolution Enhancement of Video," Proceedings of the 9th Int'l. Workshop on Artificial Intelligence and Statistics, Jan. 3, 2003, pp. 1-8, Society for Artificial Intelligence and Statistics, Key West, Florida.
Shen et al., "Optimal Pruning Quad-Tree Block-Based Binary Shape Coding", IEEE Proceedings 2007, International Conference on Image Processing, ICIP. 2007, pp. V1-437-V1-440.
Han et al., "Rank-based Image Transformation for Entropy Coding Efficiently", Proceedings of the Fourth Annual ACIS International Conference on Computer and Information Science (ICIS'05), IEEE 2005.
Xu et al., Probability Updating-based Adaptive Hybrid Coding (PUAHC), ISCAS 2006, IEEE 2006, pp. 361-364.
Zhang et al., "Method and Apparatus for Data Pruning for Video Compression Using Example-Based Super-Resolution", Invention Disclosure, Apr. 2010.
Dumitras et al., "A Texture Replacement Method at the Encoder for Bit-Rate Reduction of Compressed Video", IEEE Transactions on Circuits and Systems for Video Technology, vol. 13, No. 2, Feb. 2003, pp. 163-175.
Yap et al., "Unsupervised Texture Segmentation Using Dominant Image Modulations", IEEE Conference Recordings of the 34th Asilomar Conference on Signals, Systems and Computers, IEEE 2000, pp. 911-915.
Sermadevi et al.. "Efficient Bit Allocation for Dependent Video Coding", Proceedings of the Data Compression Conference (DCC'04), IEEE, 2004.
Krutz et al., Windowed Image Registration for Robust Mosaicing of Scenes with Large Background Occlusions, ICIP 2006, vols. 1-7, IEEE, 2006, pp. 353-356.
Dorr et al., "Clustering Sequences by Overlap", International Journal Data Mining and Bioinformatics, vol. 3. No. 3, 2009, pp. 260-279.

Zhu et al., "Video Coding with Spatio-Temporal Texture Synthesis", Proceedings of the 2007 IEEE International Conference on Multimedia and Expo, Jul. 1, 2007, pp. 112-115.
Wu et al., Image Compression by Visual Pattern Vector Quantization (VPVQ), Proceedings of the 2008 Data Compression Conference, Mar. 25, 2008, pp. 123-131.
Vo et al, "Data Pruning-Based Compression Using High Order Edge-Directed Interpolation", IEEE Conference on Acoustics, Speech and Signal Processing, Taiwan ROC, 2009, pp. 997-1000.
Smolic et al., "Improved Video Coding Using Long-term Global Motion Compensation", Visual Communications and Image Processing, Jan. 20, 2004, pp. 343-354.
Schuster et al., "An Optimal Polygonal Boundary Encoding Scheme in the Rate Distortion Sense", IEEE Transactions on Image Processing, vol. 7, No. 1, Jan. 1998, pp. 13-26.
Sun et al., "Classified Patch Learning for Spatially Scalable Video Coding", Proceedings of the 16th IEEE International Conference on Image Processing, Nov. 7, 2009, pp. 2301-2304.
Wiegand et al., "Overview of the H.264/AVC Video Coding Standard", IEEE Transactions on Circuits and Systems for Video Technology, vol. 13, No. 7, Jul. 2003, pp. 560-576.
Zheng et al., "Intra Prediction Using Template Matching with Adaptive Illumination Compensation", ICIP 2008, IEEE 2008, pp. 125-128.
Dumitras et al., "An Encoder-Decoder Texture Replacement Method with Application to Content-Based Movie Coding", IEEE Transactions on Circuits and Systems for Video Technology, vol. 14, No. 6, Jun. 2004, pp. 825-840.
Liu et al., "Intra Prediction via Edge-Based Inpainting", IEEE 2008 Data Compression Conference, Mar. 25-27, 2008, pp. 282-291.
Xiong et al., "Block-Based Image Compression with Parameter-Assistant Inpainting", IEEE Transactions on Image Processing, vol. 19, No. 6, Jun. 2010, pp. 1651-1657.
Zhu et al., "Video Coding with Spatio-Temporal Texture Synthesis and Edge-Based Inpainting", IEEE International Conference on Multimedia and Expo (ICME), 2008, pp. 813-816.
Zhang et al, "Video Decoding Using Block-based Mixed-Resolution Data Pruning", Invention Disclosure, Mar. 2010.
Porikli et al., "Compressed Domain Video Object Segmentation", IEEE Transactions on Circuits and Systems for Video Technology, vol. 20, No. 1, Jan. 2010, pp. 1-14.
Zhang et al., "Segmentation for Extended Target in Complex Backgrounds Based on Clustering and Fractal", Optics and Precision Engineering, vol. 17, No. 7, Jul. 2009, pp. 1665-1671.
Zhang et al., "Example-Based Data Pruning for Improving Video Compression Efficiency", Invention Disclosure, Apr. 2010.
Bhagavathy et al., "A Data Pruning Approach for Video Compression Using Motion-Guided Down-Sampling and Super-Resollution", submitted to ICIP 2010, pp. 1-4.
Komodakis et al., "Image Completion Using Efficient Belief Propagation Via Priority Scheduling and Dynamic Pruning", IEEE Transactions on Image Processing, vol. 16, No. 11, Nov. 1, 2007, pp. 2649-2661.
Freeman et al., "Example-based Super-Resolution", IEEE Coomputer Graphics and Applications, Mar./Apr. 2002, pp. 56-65.
Bertalmio et al., "Image tripainting", Proceedings of SIGGRAPH 2000, New Orleans, USA, Jul. 2000, pp. 1-8.
Ndjiki-Nya et al., "A Generic and Automatic Content-based Approach for Improved H.264/MPEG4-AVC Video Coding", IEEE International Conference on Image Processing (ICIP), 2005, pp. 1-4.
Lowe, "Distinctive Image Features from Scale-Invariant Keypoints", International Journal of Comoputer Vision, vol. 2, No. 60, 2004, pp. 1-28.
Vu et al., "Efficient Pruning Schemes for Distance-Based Outlier Detection", Springer Verlag, Proceedings European Conference 2009, pp. 160-175.
Zhang et al., "Video Decoding Using Blocked-Based Mixed-Resolution". Invention Disclosure, Mar. 2010.
Ben-Ezra et al., "Video Super-Resolution Using Controlled Subpixel Detector Shifts", IEEE Transactions on Pattern Analysis and Machine Intelligence, vol. 27, No. 6, Jun. 2005, pp. 977-987.

(56) References Cited

OTHER PUBLICATIONS

ITU-T H.264 Standard, "Advanced Video Coding for Generic Audiovisual Services", International Telecommunication Union, Mar. 2005, 343 pages.
Sawhney et al., Hybrid Stereo Camera: An IBR Approach for Synthesis of Very High Resolution Stereoscopic Image Sequences, Proc. SIGGRAPH, 2001, pp. 451-460.
Katsaggelos et al., "High-Resolution Images from Low-Resolution Compressed Video", IEEE Signal Processing Magazine, vol. 20, No. 3, May 1, 2003, pp. 37-48.
Li et al., "Example-Based Image Super-Resolution with Class-Specific Predictors", Journal of Visual Communication and Image Representation, vol. 20, No. 5, Jul. 1, 2009, pp. 312-322.
Lee et al., "Robust Frame Synchronization for Low Signal-to-Noise Ratio Channels Using Energy-Corrected Differential Correlation", EURASIP Journal on Wireless Communications and Networking, vol. 2009 (2009), Article ID 345989, online May 17, 2010, 8 pages.
US Office Action for Related U.S. Appl. No. 13/821,283 dated Dec. 22, 2015.
US Office Action for Related U.S. Appl. No. 13/821,083 dated Jan. 29, 2016.
US Office Action for Related U.S. Appl. No. 13/821,436 dated Nov. 25, 2015.
International Search Report for Corresponding International Appln. PCT/US2011/050921 dated Jan. 4, 2012.
International Search Report for Corresponding International Appln. PCT/US2011/050923 dated Jan. 5, 2012.
International Search Report for Corresponding Appln. PCT/US2011/050925 dated Jan. 6, 2012.
International Search Report for Corresponding Appln. PCT/US2011/050915 dated Jul. 30, 2012.
International Search Report for Corresponding International Appln. PCT/US2011/050918 dated Jan. 5, 2012.
International Search Report for Corresponding International Appln. PCT/US2011/050920 dated Jan. 4, 2012.
International Search Report for Corresponding Appln. PCT/US2011/050922 dated Jan. 4, 2012.
International Search Report for International Application PCT/US11/050924 dated Jan. 5, 2012.
International Search Report for Corresponding Appln. PCT/US2011/000107 dated Apr. 20, 2011.
International Search Report for Corresponding Appln. PCT/US2011/000117 dated Apr. 29, 2011.
International Search Report for Corresponding Appln. PCT/US2011/050913 dated Jul. 30, 2012.
International Search Report for Corresponding Appln. PCT/US2011/050917 dated Jan. 5, 2012.
International Search Report for Corresponding Appln. PCT/US2011/050919 dated Jan. 4, 2012.
Notice of Allowance for Corresponding U.S. Appl. No. 13/574,428 dated Feb. 20, 2015.
Non-Final OA for Corresponding U.S. Appl. No. 13/522,024 dated Mar. 27, 2015.
US Office Action for Related U.S. Appl. No. 13/821,078 Dated Jun. 5, 2015.
US Office Action for Related U.S. Appl. No. 13/821,436 Dated Jun. 18, 2015.
US Office Action for Related U.S. Appl. No. 13/820,901 Dated May 5, 2015.
US Office Action for Related U.S. Appl. No. 13/821,130 Dated Jun. 16, 2015.
US Office Action for Related U.S. Appl. No. 13/821,393 Dated Jul. 10, 2015.
CN Search report for Related CN Application No. 201180054405.8 dated Nov. 30, 2015.
Non-Final US Office Action for related U.S. Appl. No. 13/821,357 dated Aug. 13, 2015.
Non-Final Office Action for related U.S. Appl. No. 13/821,257 dated Aug. 19, 2015.
Non-Final Office Action for related U.S. Appl. No. 13/821,283 dated Aug. 17, 2015.
Non-Final Office Action for related U.S. Appl. No. 13/821,083 dated Jul. 16, 2015.
Non-Final Office Action for related U.S. Appl. No. 13/821,270 dated Jul. 16, 2015.
China Search Report for Related CN Application No. 201180043595.3 Dated Aug. 18, 2015.
CN Search Report for Related CN Application No. 2011800432758 dated Sep. 23, 2015.
CN Search Report for Related CN Application No. 201180006921.3 dated Nov. 21, 2014.
CN Search Report for Related CN Application No. 2011800153355 dated Nov. 22, 2014.
CN Search Report for Related CN Application 2011800437234 dated Sep. 16, 2015.
CN Search Report for Related CN Application 201180054419X dated Sep. 8, 2015.
CN Search Report for Related CN Application 2011800432940 dated Jul. 28, 2015.
CN Search Report for Related CN Application 201180053976.X dated Sep. 23, 2015.
CN Search Report for related CN Appln 20111800153355 dated Sep. 16, 2015.
US Office Action for Related U.S. Appl. No. 13/820,901 dated Dec. 18, 2015.
US Office Action for Related U.S. Appl. No. 13/821,257 dated Dec. 21, 2015.
US Office Action for Related U.S. Appl. No. 13/821,130 dated Jan. 14, 2016.
US Office Action for Related U.S. Appl. No. 13/821,357 dated Dec. 21, 2015.
US Office Action for Related U.S. Appl. No. 13/821,393 dated Dec. 11, 2015.
US Office Action for Related U.S. Appl. No. 13/821,078 dated Jan. 13, 2016.
US Notice of Allowance of Allowance for U.S. Appl. No. 13/522,024 dated Mar. 14, 2016.
US Notice of Allowance of Allowance for U.S. Appl. No. 13/821,424 dated Mar. 14, 2016.
Shimauchi Kazuhiro, "JPEG Based Image Compression Using Adaptive Multi Resolution Conversion," The 17th Workshop on Circuits and Systems in Karuizawa, The Institute of Electronics, Information and Communication Engineers, Apr. 27, 2004, pp. 147-152.
US Non-Final Office Action for U.S. Appl. No. 13/821,130 Dated Jul. 11, 2016.
US Non-Final Office Action for U.S. Appl. No. 13/821,436 Dated Jul. 11, 2016.
US Non-Final Office Action for U.S. Appl. No. 13/820,901 Dated May 18, 2016.
US Final Office for U.S. Appl. No. 13/821,270 Dated Feb. 26, 2016.

\* cited by examiner

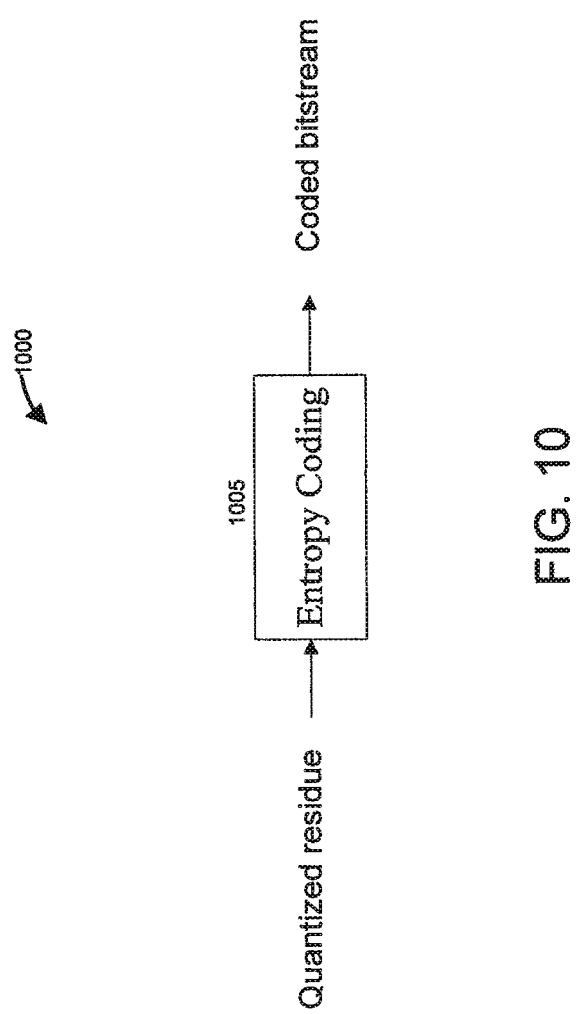

METHODS AND APPARATUS FOR PRUNING DECISION OPTIMIZATION IN EXAMPLE-BASED DATA PRUNING COMPRESSION

This application claims the benefit, under 35 U.S.C. §365 of International Application PCT/US2011/050925, filed Sep. 9, 2011, which was published in accordance with PCT Article 21(2) on Mar. 15, 2012 in English and which claims the benefit of U.S. provisional patent application No. 61/403,109, filed Sep. 10, 2010.

This application is related to the following co-pending, commonly-owned, patent applications:

(1) International (PCT) Patent Application Ser. No. PCT/US11/000107 entitled A SAMPLING-BASED SUPER-RESOLUTION APPROACH FOR EFFICENT VIDEO COMPRESSION filed on Jan. 20, 2011;

(2) International (PCT) Patent Application Ser. No. PCT/US11/000117 entitled DATA PRUNING FOR VIDEO COMPRESSION USING EXAMPLE-BASED SUPER-RESOLUTION filed on Jan. 21, 2011;

(3) International (PCT) Patent Application Ser. No. PCT/US2011/050913 entitled METHODS AND APPARATUS FOR ENCODING VIDEO SIGNALS USING MOTION COMPENSATED EXAMPLE-BASED SUPER-RESOLUTION FOR VIDEO COMPRESSION filed on Sep. 9, 2011;

(4) International (PCT) Patent Application Ser. No. PCT/US2011/050917 entitled METHODS AND APPARATUS FOR ENCODING VIDEO SIGNALS USING EXAMPLE-BASED DATA PRUNING FOR IMPROVED VIDEO COMPRESSION EFFICIENCY filed on Sep. 9, 2011;

(5) International (PCT) Patent Application Ser. No. PCT/US2011/050918 entitled METHODS AND APPARATUS FOR DECODING VIDEO SIGNALS USING EXAMPLE-BASED DATA PRUNING FOR IMPROVED VIDEO COMPRESSION EFFICIENCY filed on Sep. 9, 2011;

(6) International (PCT) Patent Application Ser. No. PCT/US2011/050919 entitled METHODS AND APPARATUS FOR ENCODING VIDEO SIGNALS FOR BLOCK-BASED MIXED-RESOLUTION DATA PRUNING filed on Sep. 9, 2011;

(7) International (PCT) Patent Application Ser. No. PCT/US2011/050920 entitled METHODS AND APPARATUS FOR DECODING VIDEO SIGNALS FOR BLOCK-BASED MIXED-RESOLUTION DATA PRUNING filed on Sep. 9, 2011;

(8) International (PCT) Patent Application Ser. No. PCT/US2011/050921 entitled METHODS AND APPARATUS FOR EFFICIENT REFERENCE DATA ENCODING FOR VIDEO COMPRESSION BY IMAGE CONTENT BASED SEARCH AND RANKING filed on Sep. 9, 2011;

(9) International (PCT) Patent Application Ser. No. PCT/US2011/05092 entitled METHOD AND APPARATUS FOR EFFICIENT REFERENCE DATA DECODING FOR VIDEO COMPRESSION BY IMAGE CONTENT BASED SEARCH AND RANKING filed on September 9;

(10) International (PCT) Patent Application Ser. No. PCT/US2011/050923 entitled METHOD AND APPARATUS FOR ENCODING VIDEO SIGNALS FOR EXAMPLE-BASED DATA PRUNING USING INTRA-FRAME PATCH SIMILARITY filed on Sep. 9, 2011;

(11) International (PCT) Patent Application Ser. No. PCT/US2011/050924 entitled METHOD AND APPARATUS FOR DECODING VIDEO SIGNALS WITH EXAMPLE-BASED DATA PRUNING USING INTRA-FRAME PATCH SIMILARITY filed on Sep. 9, 2011.

The present principles relate generally to video encoding and decoding and, more particularly, to methods and apparatus for pruning decision optimization in example-based data pruning compression.

The idea of combining data pruning technology and video compression has been explored. For example, in first, second, and third approaches, texture regions are removed at the encoder and are recovered using texture synthesis tools at the decoder. These approaches could decrease the rates of encoding video data and hence improve the compression efficiency. However, both the encoder and decoder require modifications and the improvement is limited. A fourth approach proposed a line removal based method to rescale a video by removing some horizontal or vertical lines with a least-square minimization framework, and using a high-order interpolation method to upscale the video to full resolution at the decoder. The fourth approach is an out-of-loop approach which does not need to modify the encoder and decoder, but fails to achieve compression efficiency gain according to their experimental results. In a fifth approach, several down-sampled frames are generated from the original frame at the encoder side. A full resolution frame is then re-synthesized from the decoded down-sampled frames at the decoder side. However, experiments show that the fifth approach achieves little improvement over conventional encoders.

All the above schemes only have a limited source to recover the missing data and, hence, constrain the efficiency improvement. Therefore, some preliminary research on the exampled-based schemes has been conducted. An example-based super-resolution data pruning scheme is proposed in a sixth approach. A representative patch library is trained from the original video data. Then the down-sampled video and the patch library are encoded and the full resolution video is obtained by performing the exampled-based super resolution method at the decoder side. It is difficult to achieve compression gain because encoding the patch library consumes a lot of bits. Therefore, a novel exampled-based data pruning scheme is proposed in a seventh approach. Instead of transmitting the patch library itself, the patch library can be created by training the previous or current decoded frames at the decoder side. Furthermore, metadata that includes pruning results and the locations of best-match patches are also transmitted to the decoder side to assist in the recovery of missing regions. The seventh approach obtains a better compression performance at low bitrates for some sequences. However, the seventh approach has a big loss at other bitrates because it adopts a fixed threshold to decide the pruning regions based only on the distortion.

These and other drawbacks and disadvantages of these approaches are addressed by the present principles, which are directed to methods and apparatus for pruning decision optimization in example-based data pruning compression.

According to an aspect of the present principles, there is provided an apparatus for encoding a picture in a video sequence. The apparatus includes a patch library creator for creating a first patch library from an original version of the picture and a second patch library from a reconstructed version of the picture. Each of the first patch library and the second patch library includes a plurality of high resolution replacement patches for replacing one or more pruned blocks during a recovery of a pruned version of the picture. The apparatus also includes a pruner for generating the pruned version of the picture from the first patch library, and for deciding whether to respectively replace one or more original blocks from the original version of the picture with the one or more pruned blocks responsive to a comparison between a first rate-distortion estimate and a second rate-distortion estimate. The first rate-distortion estimate and the second rate-distortion estimate are based on both a distortion component and a bitrate component. The apparatus further includes a metadata generator for generating metadata from the second patch library. The metadata is for recovering the pruned version of the picture. The apparatus additionally includes an encoder for encoding the pruned version of the picture and the metadata.

According to another aspect of the present principles, there is provided a method for encoding a picture in a video sequence. The method includes creating a first patch library from an original version of the picture and a second patch library from a reconstructed version of the picture. Each of the first patch library and the second patch library includes a plurality of high resolution replacement patches for replacing one or more pruned blocks during a recovery of a pruned version of the picture. The method also includes generating the pruned version of the picture from the first patch library, and deciding whether to respectively replace one or more original blocks from the original version of the picture with the one or more pruned blocks responsive to a comparison between a first rate-distortion estimate and a second rate-distortion estimate. The first rate-distortion estimate and the second rate-distortion estimate are based on both a distortion component and a bitrate component. The method further includes generating metadata from the second patch library. The metadata is for recovering the pruned version of the picture. The method additionally includes encoding the pruned version of the picture and the metadata using an encoder.

According to yet another aspect of the present principles, there is provided an apparatus for encoding a picture in a video sequence. The apparatus includes means for creating a first patch library from an original version of the picture and a second patch library from a reconstructed version of the picture. Each of the first patch library and the second patch library includes a plurality of high resolution replacement patches for replacing one or more pruned blocks during a recovery of a pruned version of the picture. The apparatus also includes means for generating the pruned version of the picture from the first patch library, and for deciding whether to respectively replace one or more original blocks from the original version of the picture with the one or more pruned blocks responsive to a comparison between a first rate-distortion estimate and a second rate-distortion estimate. The first rate-distortion estimate and the second rate-distortion estimate are based on both a distortion component and a bitrate component. The apparatus further includes means for generating metadata from the second patch library. The metadata is for recovering the pruned version of the picture. The apparatus additionally includes means for encoding the pruned version of the picture and the metadata.

These and other aspects, features and advantages of the present principles will become apparent from the following detailed description of exemplary embodiments, which is to be read in connection with the accompanying drawings.

The present principles may be better understood in accordance with the following exemplary figures, in which:

FIG. 10 is a block diagram showing an exemplary apparatus for bitrate estimation when entropy coding is used, in accordance with an embodiment of the present principles.

Figure 1:
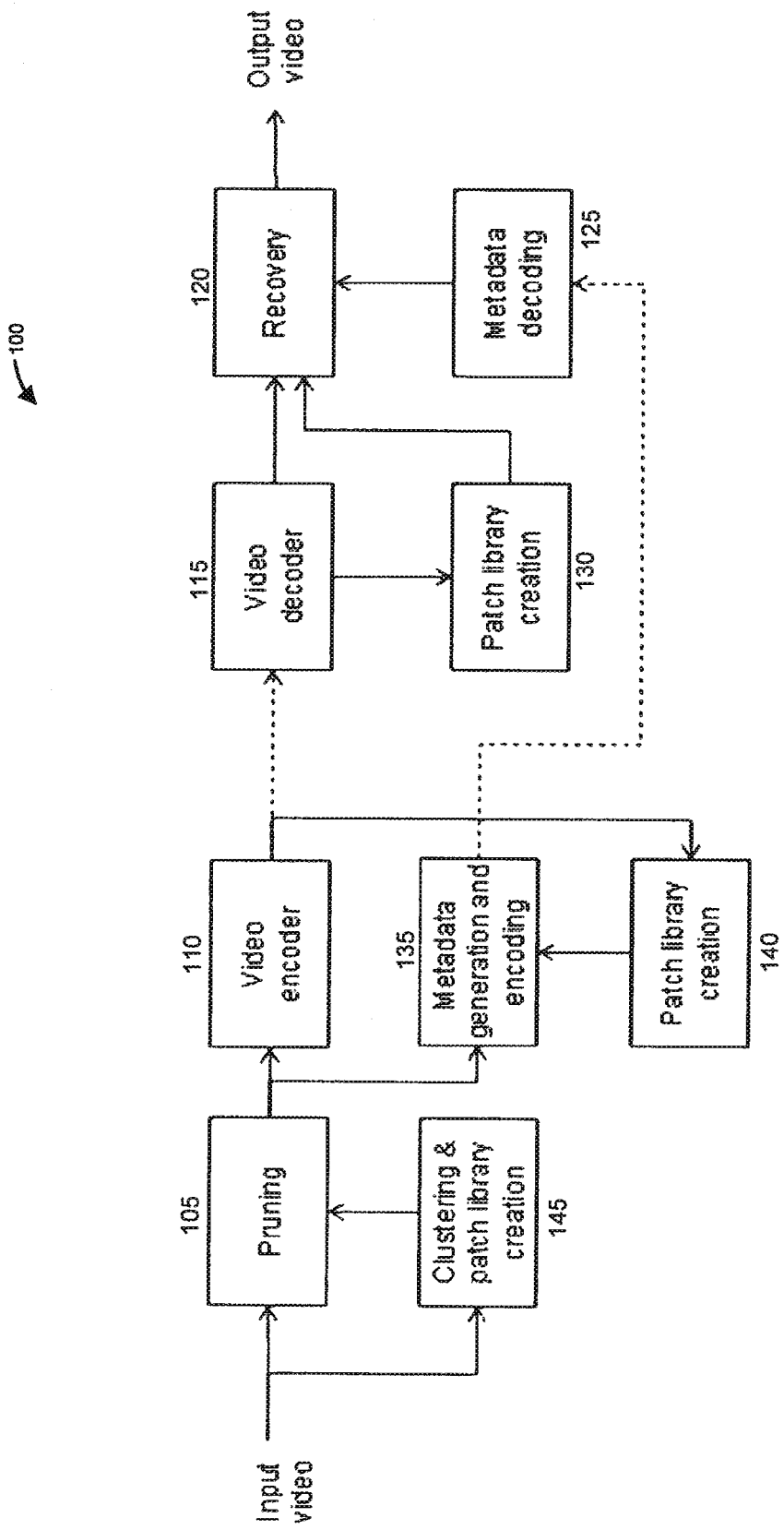
FIG. 1 is a block diagram showing an exemplary example-based data pruning system having training frames obtained from decoded frames, in accordance with an embodiment of the present principles.

The present principles are directed to methods and apparatus for pruning decision optimization in example-based data pruning compression.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the phrase "example-based compression" refers to a data pruning method that creates a patch library using a set of training frames that are accessible for both encoder and decoder sides, and uses the patch library to remove the coding blocks in the frames at the encoder side and recover the blocks in the video frames at the decoder side.

Turning to FIG. 1, an exemplary example-based data pruning system having training frames obtained from decoded frames is indicated generally by the reference numeral 100. The pruning system 100 includes a pruner 105 having an output connected in signal communication with an input of a video encoder 110 and a first input of a metadata generator and encoder 135. An output of the video encoder is connected in signal communication with an input of a video decoder 115 and an input of a patch library creator 140. An output of the video decoder 115 is connected in signal communication with a first input of a recovery device 120. An output of the patch library creator 130 is connected in signal communication with a second input of the recovery device 120. An output of the metadata generator and encoder 135 is connected in signal communication with an input of a metadata decoder 125. An output of the metadata decoder 125 is connected in signal communication with a third input of the recovery device 120. An output of the patch library creator 140 is connected in signal communication with a second input of the metadata generator and encoder 135. An output of a clustering device and patch library creator 145 is connected in signal communication with a second input of the pruner 105. An input of the pruner 105 and an input of the clustering device and patch library creator 145 are available as inputs to the pruning system 100, for receiving input video. An output of the recovery device is available as an output of the pruning system 100, for outputting video.

Figure 2:
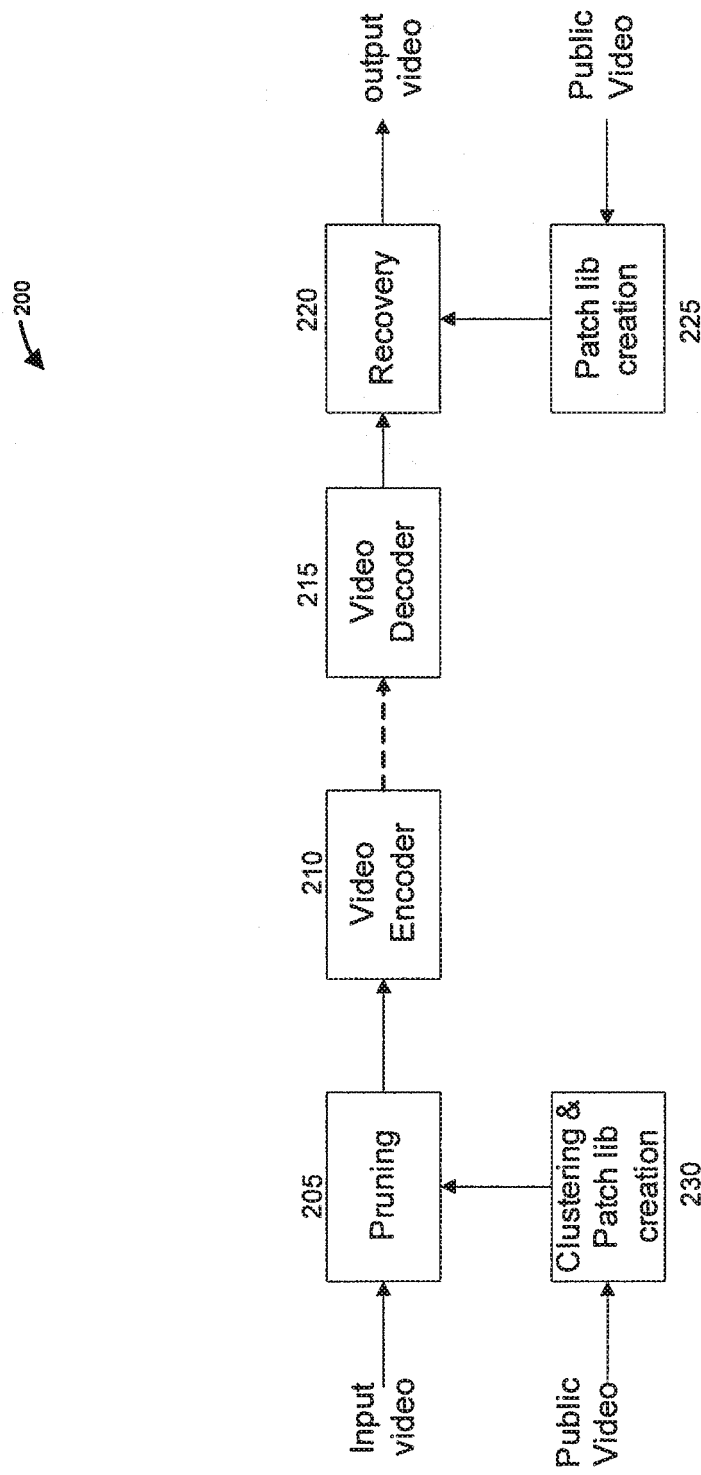
FIG. 2 is a block diagram showing an exemplary example-based data pruning system having training frames obtained from public resources, in accordance with an embodiment of the present principles.

Turning to FIG. 2, an exemplary example-based data pruning system having training frames obtained from public resources is indicated generally by the reference numeral 200. The pruning system 200 includes a pruner 205 having an output connected in signal communication with an input of a video encoder 210. An output of the video encoder 210 is connected in signal communication with an input of a video decoder 215. An output of the video decoder 215 is connected in signal communication with a first input of a recovery device 220. An output of a patch library (lib) creator 225 is connected in signal communication with a second input of the recovery device 220. An output of a clusterer and patch library (lib) creator 230 is connected in signal communication with a second input of the pruner 205. An input of the pruner 105 is available as an input of the pruning system 200, for receiving input video. An input of the clusterer and patch library creator 230 is available as an input of the pruning system 200, for receiving public video. An input of the patch library creator 225 is available as an input of the pruning system 200, for receiving public video. An output of the recovery device 220 is available as an output of the pruning system 200, for providing output video.

Figure 3:
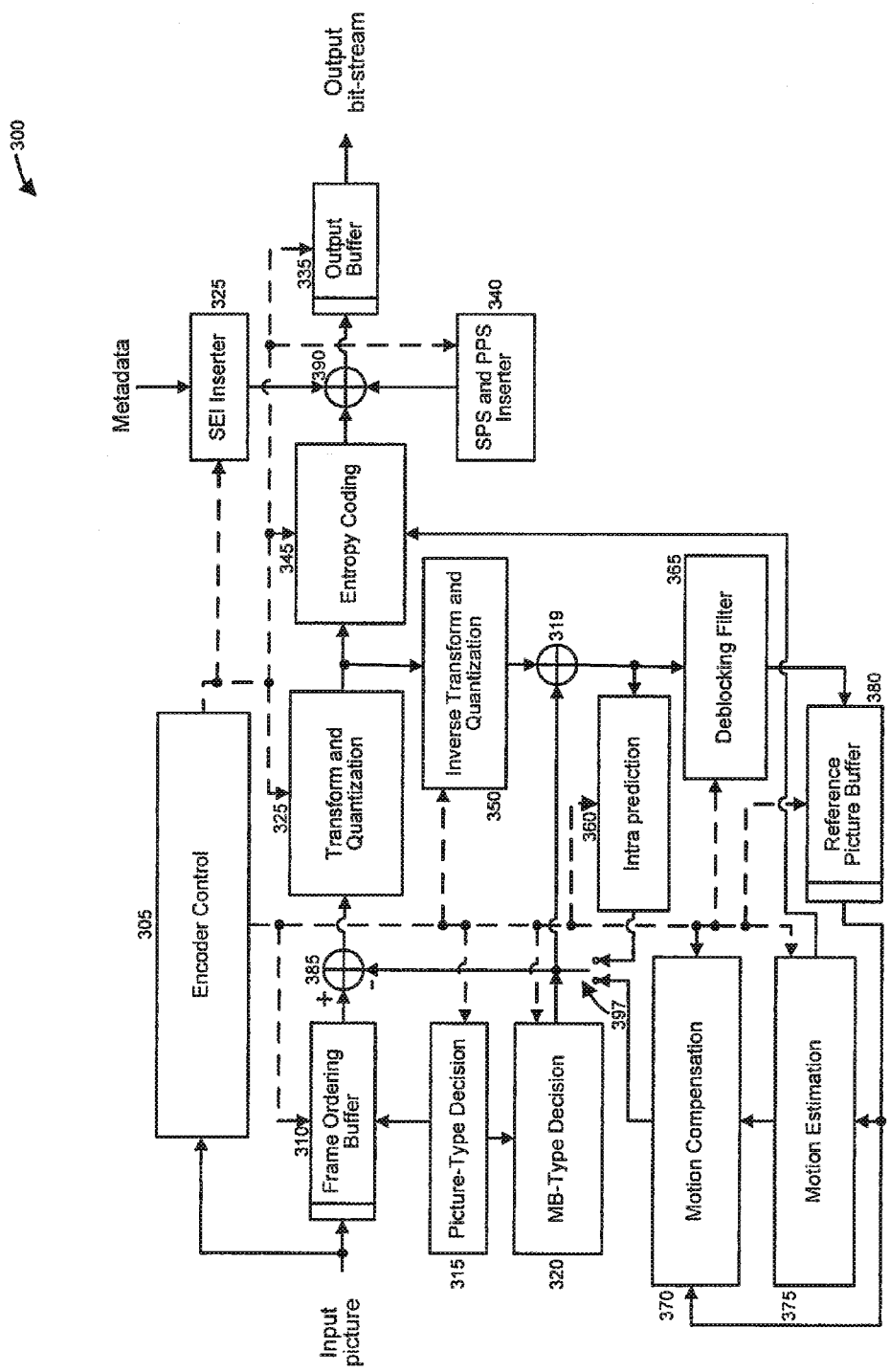
FIG. 3 is a block diagram showing an exemplary video encoder to which the present principles may be applied, in accordance with an embodiment of the present principles.

Turning to FIG. 3, an exemplary video encoder to which the present principles may be applied is indicated generally by the reference numeral 300. For example, video encoder 300 may be video encoder 110 and/or video encoder 135 in FIG. 1 and/or video encoder 210 in FIG. 2. The video encoder 300 includes a frame ordering buffer 310 having an output in signal communication with a non-inverting input of a combiner 385. An output of the combiner 385 is connected in signal communication with a first input of a transformer and quantizer 325. An output of the transformer and quantizer 325 is connected in signal communication with a first input of an entropy coder 345 and a first input of an inverse transformer and inverse quantizer 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of the frame ordering buffer 310, a second input of the inverse transformer and inverse quantizer 350, an input of a picture-type decision module 315, a first input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller 305 is connected in signal communication with a first input of a Supplemental Enhancement Information (SEI) inserter 330, a second input of the transformer and quantizer 325, a second input of the entropy coder 345, a second input of the output buffer 335, and an input of the Sequence Parameter Set (SPS) and Picture Parameter Set (PPS) inserter 340.

An output of the SEI inserter 330 is connected in signal communication with a second non-inverting input of the combiner 390.

A first output of the picture-type decision module 315 is connected in signal communication with a third input of the frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 is connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator 375 and a third input of the motion compensator 370. A first output of the motion estimator 375 is connected in signal communication with a second input of the motion compensator 370. A second output of the motion estimator 375 is connected in signal communication with a third input of the entropy coder 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and an inverting input of the combiner 385.

A first input of the frame ordering buffer 310 and an input of the encoder controller 305 are available as inputs of the encoder 100, for receiving an input picture. Moreover, a second input of the Supplemental Enhancement Information (SEI) inserter 330 is available as an input of the encoder 300, for receiving metadata. An output of the output buffer 335 is available as an output of the encoder 300, for outputting a bitstream.

Figure 4:
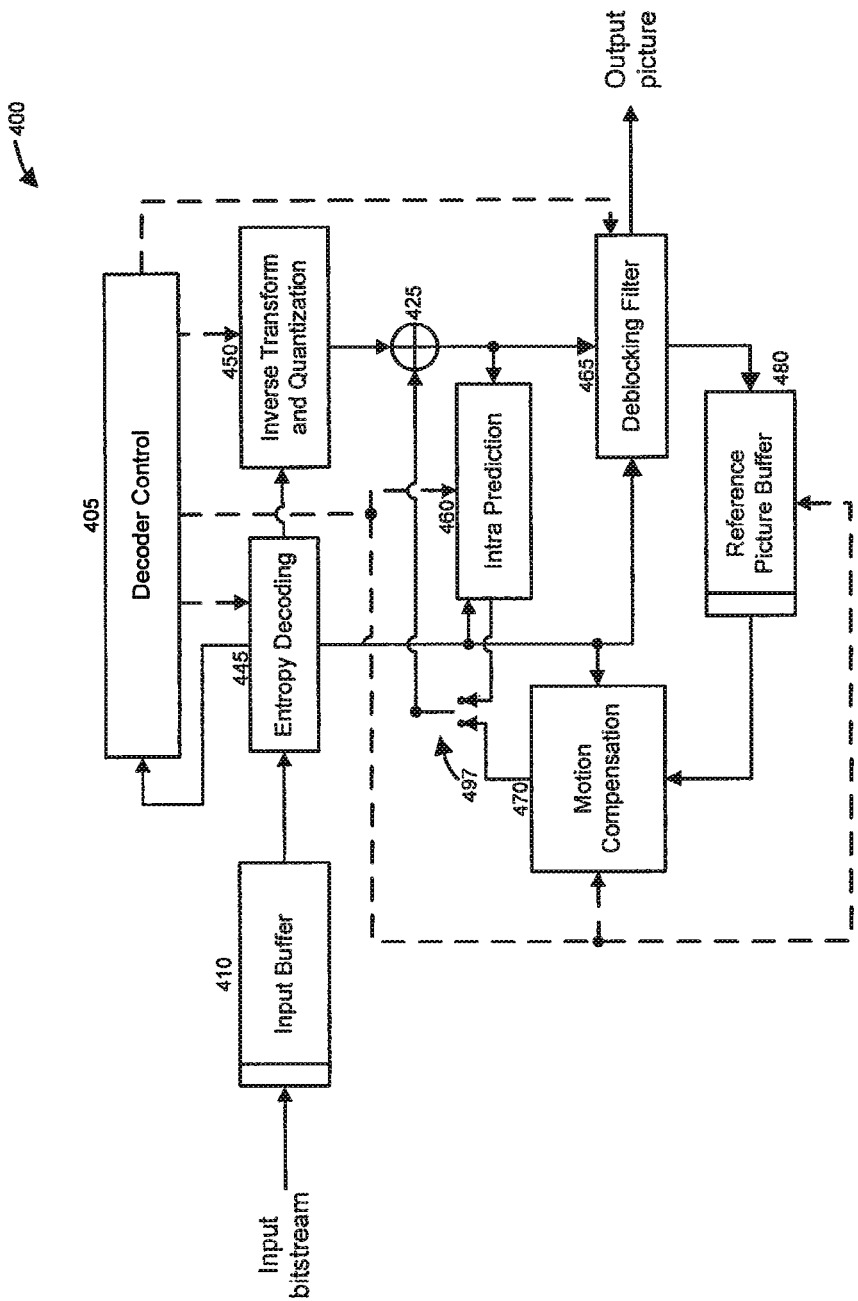
FIG. 4 is a block diagram showing an exemplary video decoder to which the present principles may be applied, in accordance with an embodiment of the present principles.

Turning to FIG. 4, an exemplary video decoder to which the present principles may be applied is indicated generally by the reference numeral 400. For example, video decoder 400 may be video decoder 115 in FIG. 1 and/or video decoder 215 in FIG. 2. The video decoder 400 includes an input buffer 410 having an output connected in signal communication with a first input of an entropy decoder 445. A first output of the entropy decoder 445 is connected in signal communication with a first input of an inverse transformer and inverse quantizer 450. An output of the inverse transformer and inverse quantizer 450 is connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. An output of the reference picture buffer 480 is connected in signal communication with a second input of a motion compensator 470.

A second output of the entropy decoder 445 is connected in signal communication with a third input of the motion compensator 470, a first input of the deblocking filter 465, and a third input of the intra predictor 460. A third output of the entropy decoder 445 is connected in signal communication with an input of a decoder controller 405. A first output of the decoder controller 405 is connected in signal communication with a second input of the entropy decoder 445. A second output of the decoder controller 405 is connected in signal communication with a second input of the inverse transformer and inverse quantizer 450. A third output of the decoder controller 405 is connected in signal communication with a third input of the deblocking filter 465. A fourth output of the decoder controller 405 is connected in signal communication with a second input of the intra prediction module 460, a first input of the motion compensator 470, and a second input of the reference picture buffer 480.

An output of the motion compensator 470 is connected in signal communication with a first input of a switch 497. An output of the intra prediction module 460 is connected in signal communication with a second input of the switch 497. An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

As noted above, the present principles are directed to pruning decision optimization in example-based data pruning compression. In accordance with an embodiment, data pruning is used as a preprocessing technology to remove a portion of video data before the video data is encoded. Missing data can be recovered at the decoder by inferring from the decoded data and a library of patches. The library of patches can be created using existing video frames or current decoded frames. Moreover, the library of patches can be maintained to be the same at both the encoder and decoder sides.

In the example-based data pruning video compression scheme, each block within a frame should be decided to be pruned or not before the encoding process. The pruning results are also encoded as side information to assist in the recovery of missing blocks at the decoder. In order to obtain a better compression performance, determining whether or not to prune parts (such as blocks) of a video frame is a crucial problem. Therefore, in accordance with the present principles, this application discloses a novel decision strategy based on rate distortion theory. This decision strategy adaptively prunes an input video to ensure the compression efficiency improvement for most sequences within a large range of bitrates.

In an embodiment, this application discloses the use of rate distortion optimization in the pruning decision process that considers both distortion and rate. As the rate distortion optimization does not require the use of any thresholds, the embodiment is adaptive to the content of different video sequences. The rate distortion optimization provides an independent decision strategy for every macroblock to guarantee that the decision is the best for the current macroblock.

Referring back to FIGS. 1 and 2, the patch library is generated by a large number of small patches coming from the existing frames that have been sent to the decoder side, or macroblocks in the current pruning frame as shown in FIG. 1, or public videos shared by both encoder and decoder sides as shown in FIG. 2. In our current scheme, the former method for patch library creation is employed (FIG. 1). In this method, there are two patch libraries at the encoder side, a patch library created from the original frames for pruning, and another patch library created from the reconstructed frames (encoded and then decoded frames) for metadata encoding. For the first patch library, a fast clustering algorithm is performed to group the patches into several clusters prior to the patch search process. For each macroblock with a size of 16×16 in the original video, a best match patch from the patch library is obtained through an efficient search process and, hence, a frame composed by the best match patches of every macroblock of the current original frame is generated. It will be utilized in the pruning process to make a decision of whether or not a macroblock is pruned and replaced by the flat region. After the pruning process, the pruned video, where some macroblocks are replaced by their direct current (DC) components, is created and sent to a video encoder, such as a video encoder compliant with the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"). The metadata including the locations of the best match patches are also encoded using the patch library created from the reconstructed frame. The patch libraries created from the reconstructed frame for metadata encoding and decoding are the same for the encoder and decoder sides.

At the decoder side, the reconstructed video is generated by the video decoder and the metadata is also decoded to assist in the recovery of the pruned video. Since the patch library at the decoder side can be created exactly the same as that at the encoder side from the reconstructed frames, the removed regions can be obtained from the patch library. Therefore, a reconstructed video is generated through the recovery process. Moreover, the clustering and search processes are not needed here and, thus, will not increase the complexity of the decoder side. The metadata only needs a much smaller amount of bits than the video data itself, and more importantly, the patch library provides a reliable source to recover the missing regions. For at least this reason, the compression efficiency can be greatly improved.

The process of creating the patch library, the clustering patches, the best match searching, the encoding and decoding of the metadata and the recovery of the missing regions is disclosed in at least one of the related and commonly-owned patent applications filed on the same day with this patent application. Herein, this application discloses a novel decision strategy in the pruning process to generate a pruned video in example-based data pruning compression.

Figure 5:
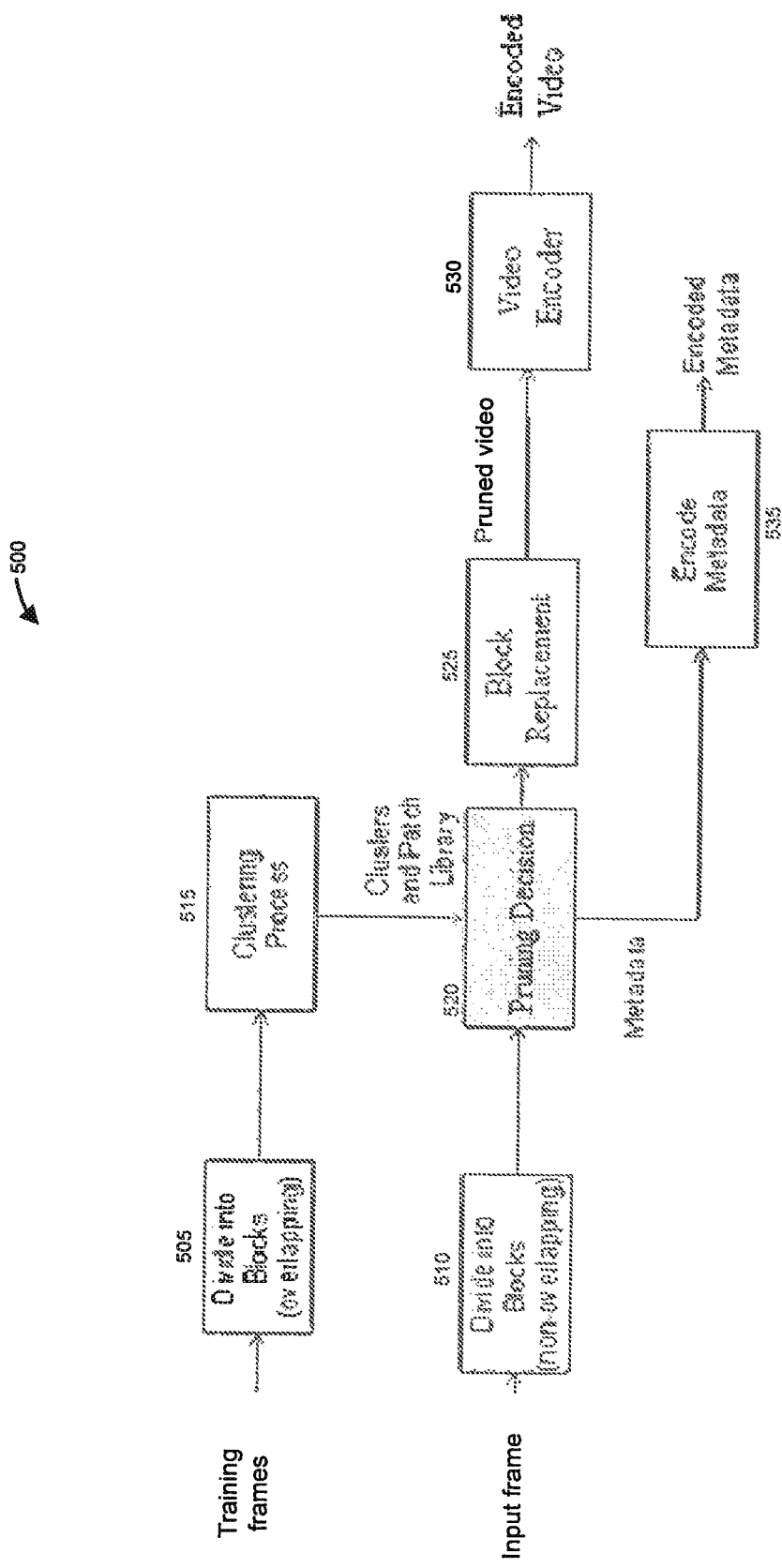
FIG. 5 is a block diagram showing an exemplary portion for performing encoder side processing in an example-based data pruning system with pruning decision optimization, in accordance with an embodiment of the present principles.

Turning to FIG. 5, an exemplary portion for performing encoder side processing in an example-based data pruning system with pruning decision optimization is indicated generally by the reference numeral 500. The portion 500 includes a divider 505 having an output in signal communication with an input of a cluster 510. An output of the cluster 510 is connected in signal communication with a first input of pruning decision device 520. An output of a divider 510 is connected in signal communication with a second input of the pruning decision device 520. A first output of the pruning decision device 520 is connected in signal communication with an input of a block replacer 525. A second output of the pruning decision device 520 is connected in signal communication with an input of a metadata encoder 535. An output of the block replacer 525 is connected in signal communication with an input of a video encoder. An input of the divider 505 is available as an input of the portion 500, for receiving training frames. An input of the divider 510 is available as an input of the portion 500, for receiving an input frame. An output of the metadata encoder 535 is available as an output of the portion 500, for outputting encoded metadata. An output of the video encoder 530 is available as an output of the portion 500, for outputting encoded video.

Pruning Decision Strategy

In other approaches, the pruning decision is made by comparing the distortion of the original and best-match patches with a fixed threshold. These approaches to the pruning decision may obtain an improvement at low bitrates, but usually results in large distortion at other bitrates. Therefore, in accordance with the present principles, this application discloses a decision strategy considering both distortion and rate to guarantee that there will not be a loss within a large range of bitrates.

In rate distortion theory, the goal of an encoder is to optimize its overall fidelity, that is, minimize the distortion D subject to a constraint $R_c$ on the number of bits R. This constrained problem can be solved by using a Lagrangian optimization method. Thus, the Lagrangian formulation of this problem may be represented as follows:

$$\min\{J\}, \text{ where } J=D+\lambda R, \qquad (1)$$

wherein $\lambda$ is the Lagrangian parameter, which is related to the quantization parameter QP.

Similar to the video compression standard, the input video frames are divided into a Group of Pictures (GOP). The pruning process is conducted on the first frame of a GOP. The pruning result is propagated to the rest of the frames in the GOP afterwards. In our approach, the following comparison is conducted for each macroblock with a size of 16×16 pixels in such frames in a progressive scanning order the same way as the encoding order in the MPEG-4 AVC Standard encoder. First, the distortion-rate cost $J_1$ for the case denoted as Case 1 is estimated when the current macroblock is not pruned (i.e., the original video data is kept intact). Second, the distortion-rate $J_2$ for the case denoted as Case 2 is estimated when the current macroblock is pruned (i.e., the whole macroblock is replaced by the DC component of the original data). Then the two distortion rates are compared, and a decision is made to prune the macroblock if $J_2<J_1$ and not to prune if $J_1<J_2$.

Figure 6:
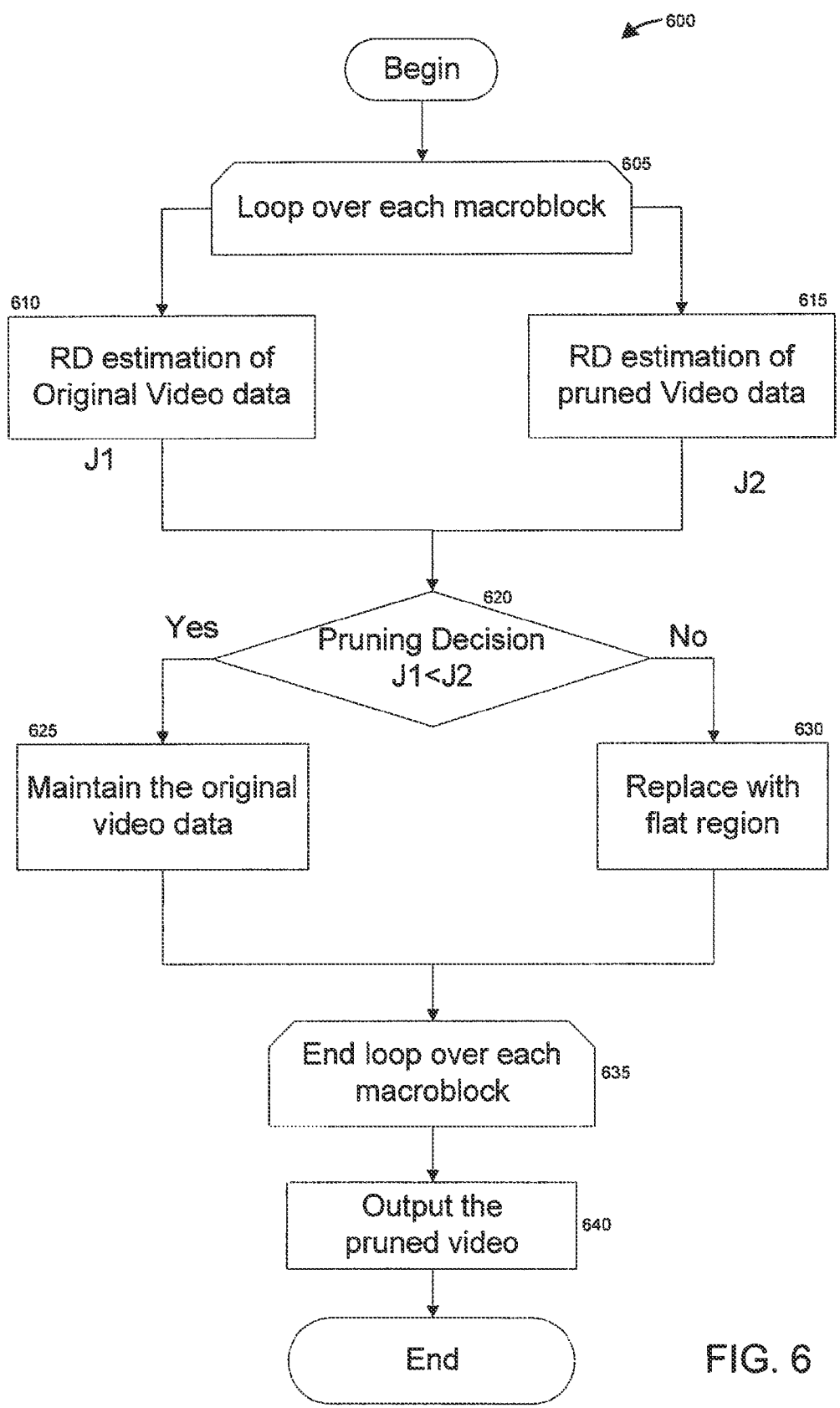
FIG. 6 is a flow diagram showing an exemplary method for rendering a pruning decision in example-based data pruning, in accordance with an embodiment of the present principles.

Turning to FIG. 6, an exemplary method for rendering a pruning decision in example-based data pruning is indicated generally by the reference numeral 600. At step 605, a loop is performed over each macroblock. At step 610, a rate-distortion (RD) estimation of original video data is performed. At step 615, a rate-distortion (RD) estimation of pruned video data is performed. At step 620, a pruning decision is determined regarding whether or not J1<J2. If so, then the method proceeds to a step 625. Otherwise, the method proceeds to a step 630. At step 625, the original video data is maintained. At step 630, the current macroblock is replaced with a flat region. At step 635, the loop over each macroblock is terminated. At step 640, the pruned video is output.

Figure 7:
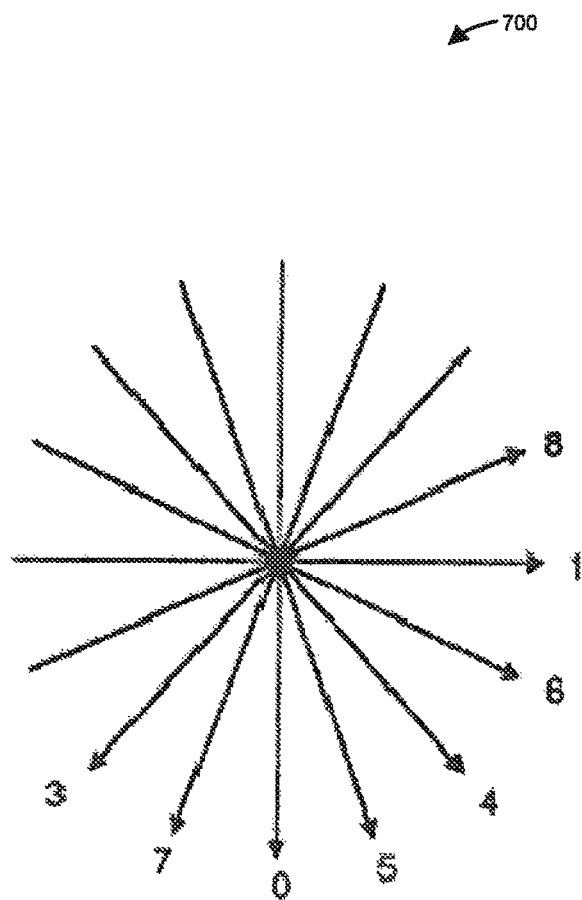
FIG. 7 is a diagram showing exemplary prediction directions for distortion estimation, in accordance with an embodiment of the present principles.

The distortion and rate estimation process for each macroblock is similar to the intra-mode decision in the MPEG-4 AVC Standard encoder. The residue of the input video data can be obtained through the prediction process. The input video data is the original video data in Case 1 and the pruned video data in Case 2. Turning to FIG. 7, exemplary prediction directions for distortion estimation are indicated generally by the reference numeral 700. In FIG. 7, the reference numeral 0 indicates a vertical prediction mode, the reference numeral 1 indicates a horizontal prediction mode, the reference numeral 3 indicates a diagonal-down/left prediction mode, the reference numeral 4 indicates a diagonal-down/right prediction mode, the reference numeral 5 indicates a vertical-right prediction mode, the reference numeral 6 indicates a horizontal-down prediction mode, the reference numeral 7 indicates a vertical-left prediction mode, and the reference numeral 8 indicates a horizontal-up prediction mode. The DC direction is not shown and its prediction is the average of the neighboring pixels.

Figure 8:
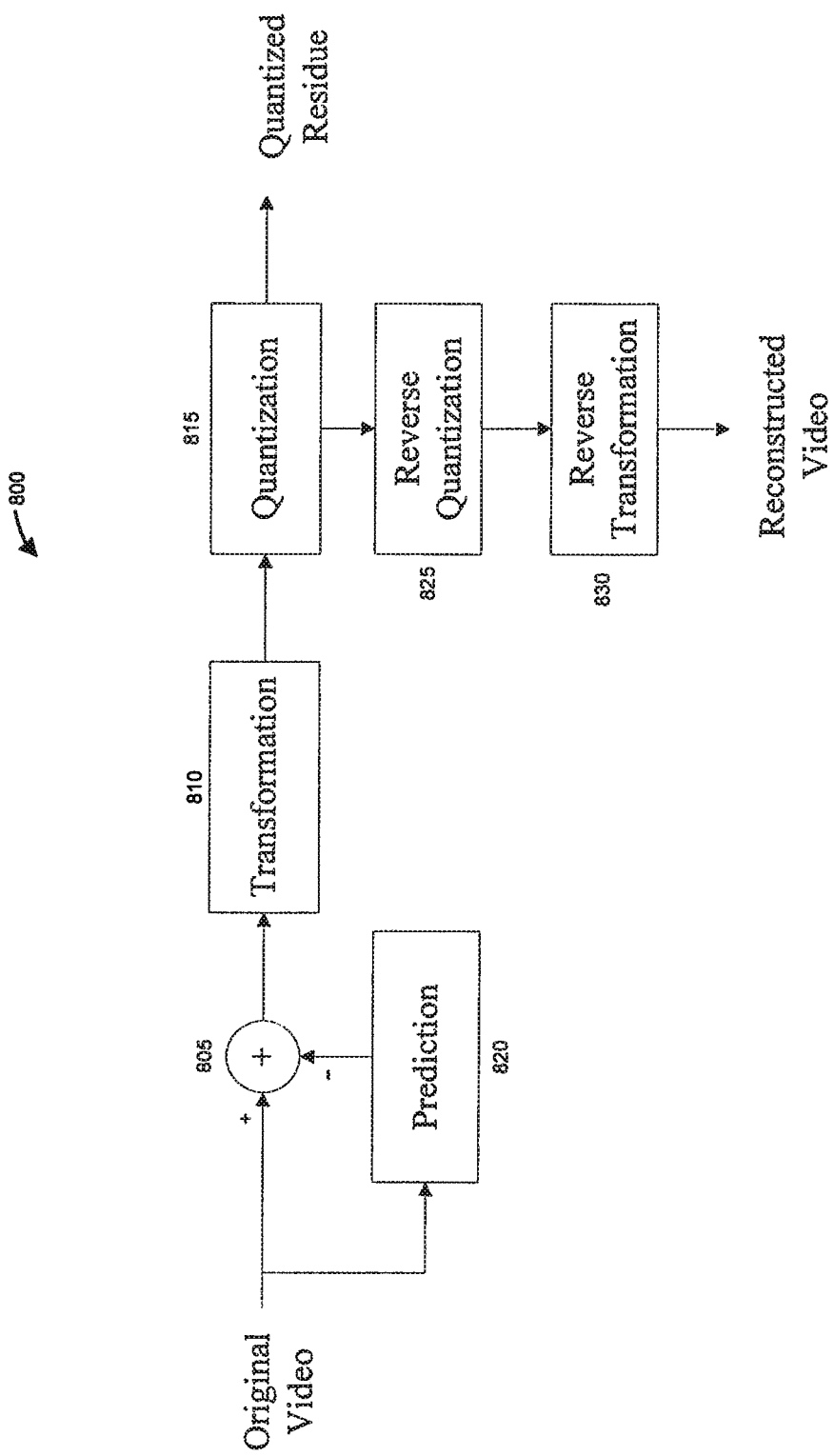
FIG. 8 is a block diagram showing an apparatus for performing distortion estimation when the input data is the original video data (Case 1), in accordance with an embodiment of the present principles.

Turning to FIG. 8, an apparatus for performing distortion estimation when the input data is the original video data (Case 1) is indicated generally by the reference numeral 800. The apparatus includes a combiner 805 having an output connected in signal communication with an input of a transformer 810. An output of the transformer 810 is connected in signal communication with an input of a quantizer 815. A first output of the quantizer 815 is connected in signal communication with an input of a reverse quantizer 825. An output of the reverse quantizer 825 is connected in signal communication with an input of a reverse transformer 830. An output of a predictor 820 is connected in signal communication with an inverting input of the combiner 805. A non-inverting input of the combiner 805 and an input of the predictor 820 are available as inputs to the apparatus 800, for receiving original video. An output of the quantizer 815 is available as an output of the apparatus 800, for outputting a quantized residue. An output of the reverse transformer 830 is available as an output of the apparatus 800, for outputting reconstructed video.

Figure 9:
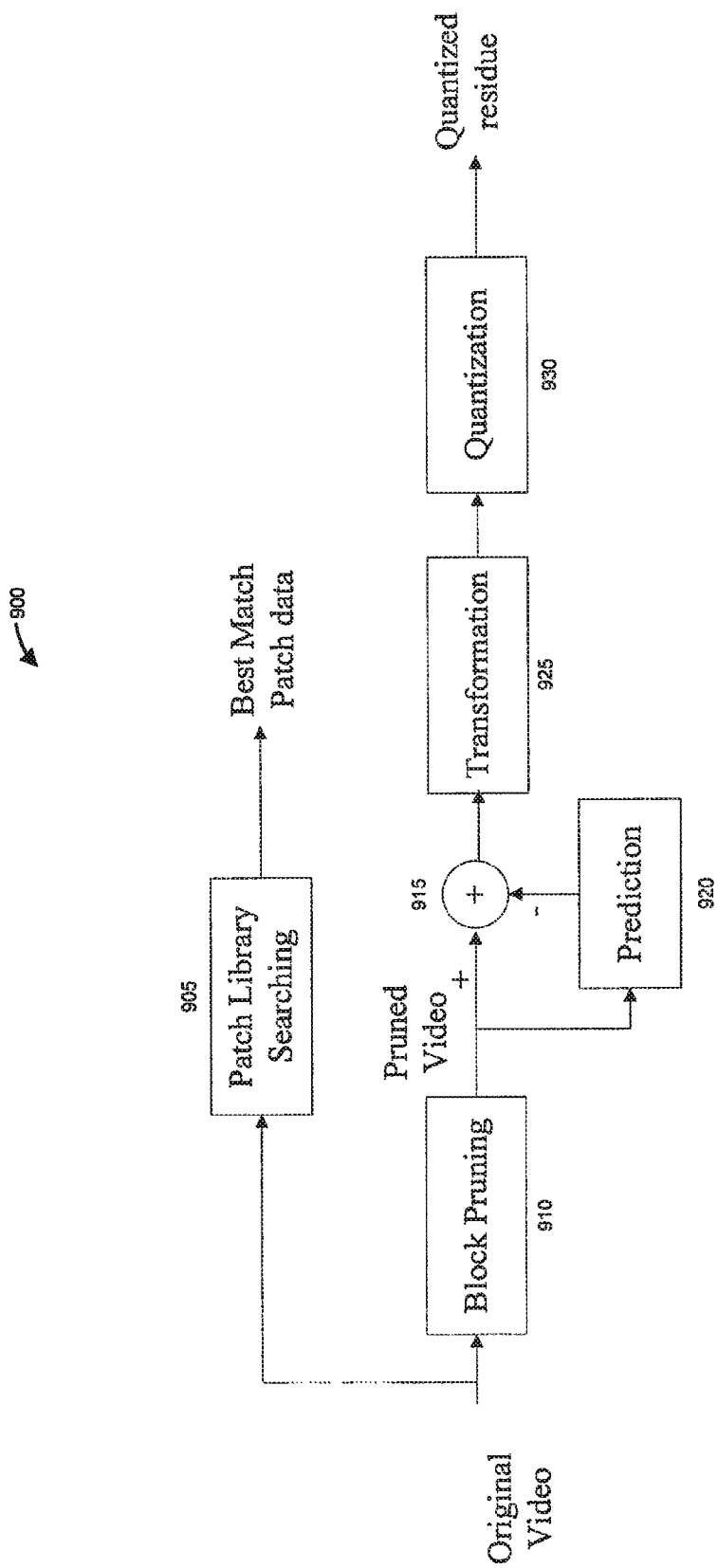
FIG. 9 is a block diagram showing an apparatus for performing distortion estimation when the input data is pruned (Case 2), in accordance with an embodiment of the present principles.

Turning to FIG. 9, an apparatus for performing distortion estimation when the input data is pruned (i.e., Case 2) is indicated generally by the reference numeral 900. The apparatus includes a block pruner 910 having an output connected in signal communication with a non-inverting input of a combiner 915 and an input of a predictor 920. An output of the predictor 920 is connected in signal communication with an inverting input of the combiner 915. An output of the combiner 915 is connected in signal communication with an input of a transformer 925. An output of the transformer 925 is connected in signal communication with an input of a quantizer 930. An input of the block pruner 910 and an input of a patch library searcher 905 are available as inputs of the apparatus 900, for receiving original video. An output of the patch library searcher 905 is available as an output of the apparatus 900, for outputting best match patch data. An output of the quantizer 930 is available as an output of the apparatus, for outputting a quantized residue.

For both Case 1 and Case 2, the residue goes through the transformation and quantization process, and then the reconstructed video data can be obtained through reverse quantization and reverse transformation. In Case 1, the distortion is calculated as the MSE (Mean Square Error) between the original video and the reconstructed video. In Case 2, the distortion is calculated as the MSE between the original video data and the best match patch data from the created patch library. For data X and Y with a size of 16×16, the definition of MSE is as follows:

$$MSE = \sum_{j=1}^{16} \sum_{i=1}^{16} (X_{ij} - Y_{ij})^2 \qquad (2)$$

There are two exemplary ways of estimating the rates. The simpler way involves estimating the values of the non-zero coefficients of the quantized residue of the original block. The more complex way involves entropy coding the quantized residue of the original block, where the rate is the bits of the coded bitstream, as illustrated in FIG. 10. Turning to FIG. 10, an exemplary apparatus for bitrate estimation when entropy coding is used is indicated generally by the reference numeral 1000. The apparatus 1000 includes an entropy coder 1005 having an input for receiving a quantized residue, and an output of outputting a coded bitstream. Context adaptive variable length coding (CAVLC) or context adaptive binary arithmetic coding (CABAC) can be used in the entropy coding process. The Lagrangian parameter $\lambda$ is related to the quantization parameter QP. Here the following formulation is utilized, which is used by the intra prediction mode decision in the standard MPEG-4 AVC Standard compression scheme as follows:

$$\lambda = 0.68 \times 2^{(QP-12)/3}. \qquad (3)$$

Experimental Results

Fourteen sequences are used for testing the performance. Among the 14 sequences, five sequences have a static background. Other sequences have different degrees of background motion. Four videos use the patch libraries trained from existing frames. The rest of the sequences use the patch library trained from the current frame. TABLE 1 shows the name, size, frame rate and training frame of the test sequences.

TABLE 1

| Sequence | Size | Frame rate(fps) | Training Frame |
|---|---|---|---|
| independence_day | 720 × 480 | 24 | existing |
| american_pie | 720 × 480 | 24 | existing |
| opening_ceremony | 720 × 480 | 30 | current |
| man_in_restaurant | 720 × 480 | 24 | Current |
| dome | 720 × 480 | 24 | Current |

TABLE 1-continued

| Sequence | Size | Frame rate(fps) | Training Frame |
|---|---|---|---|
| flower_garden2 | 720 × 480 | 30 | existing |
| baseball | 1280 × 720 | 60 | existing |
| big_mammas_house2 | 720 × 480 | 24 | current |
| carnival_ride | 720 × 480 | 30 | current |
| flamingo | 720 × 480 | 30 | current |
| partyscene | 832 × 480 | 50 | current |
| mountain | 720 × 480 | 30 | current |
| lion | 720 × 480 | 24 | current |
| statue2 | 1280 × 1072 | 24 | current |

Figure 11A:
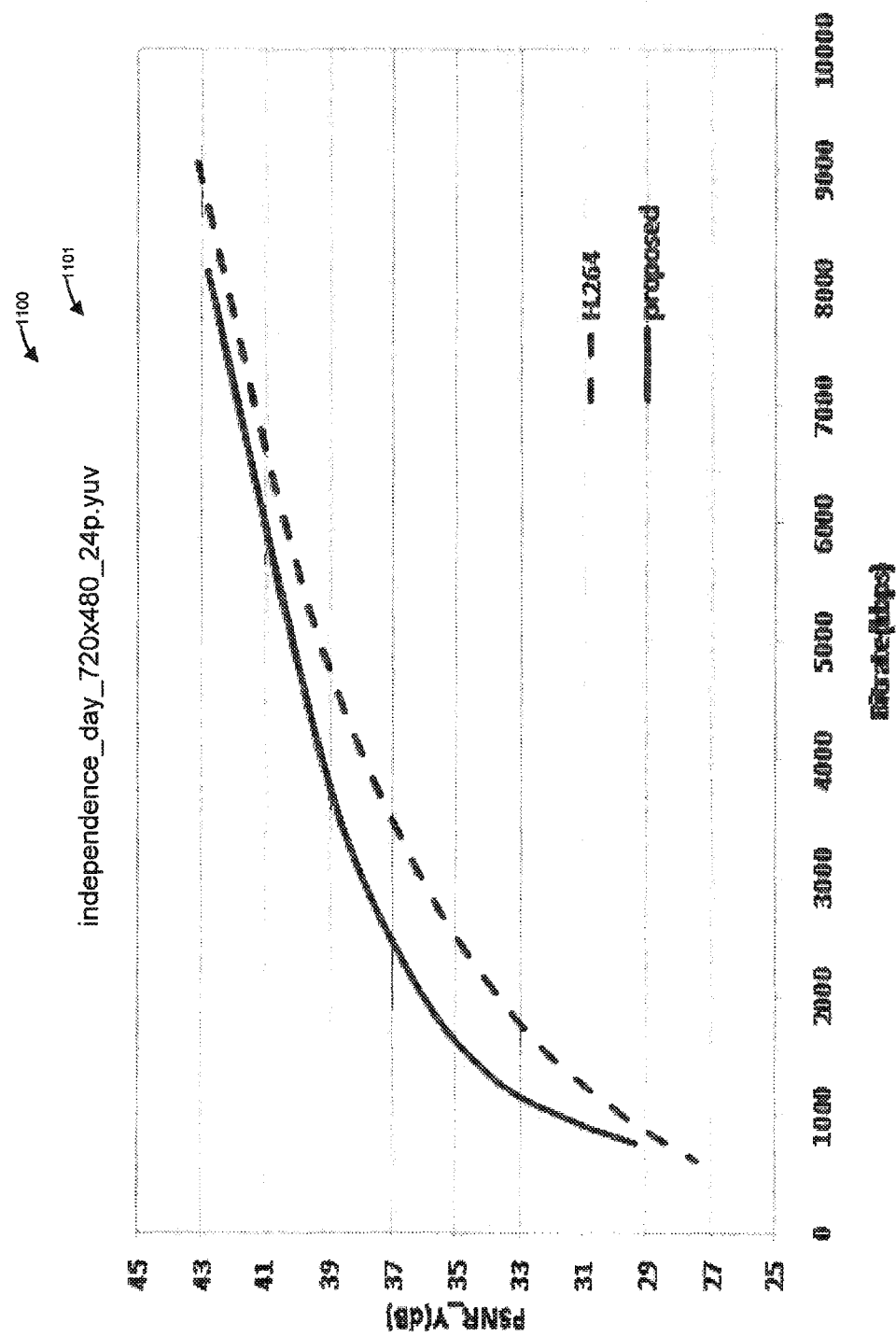
FIG. 11A-N are plots showing exemplary test results for pruning decision optimization in example-based data pruning compression, in accordance with an embodiment of the present principles.

The test conditions of the MPEG-4 AVC Standard encoder are as follows: High profile; turn on the 8×8 transform; and QP is (20, 26, 32, 38, 44, 50). The PSNR of the luminance component and the bitrates of these test sequences are illustrated in FIGS. 11A-N. Turning to FIG. 11A-N, exemplary test results for pruning decision optimization in example-based data pruning compression is indicated generally by the reference numeral 1100. In each of FIGS. 11A-N, the X-axis corresponds to the bitrate in kilobytes per second, and the Y-axis corresponds to the peak signal to noise ratio (PSNR) in decibels.

FIG. 11A corresponds to the test results 1101 for a test sequence corresponding at least a portion of the movie INDEPENDENCE DAY, with the test sequence having a resolution of 720×480 and a frame rate of 24 frames per second (fps).

Figure 11B:
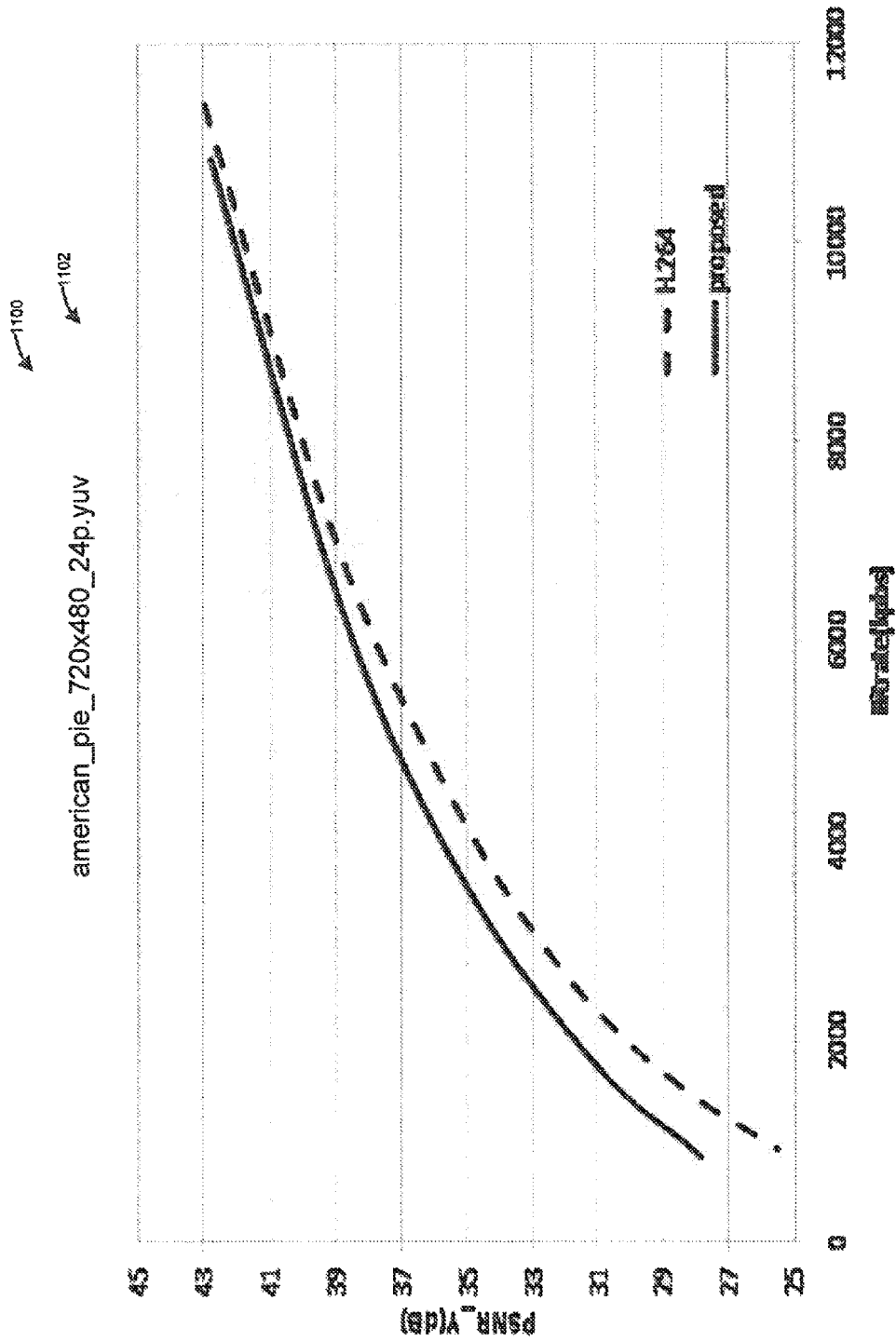

FIG. 11B corresponds to the test results 1102 for a test sequence corresponding to at least a portion of the movie AMERICAN PIE, with the test sequence having a resolution of 720×480 and a frame rate of 24 frames per second (fps).

Figure 11C:
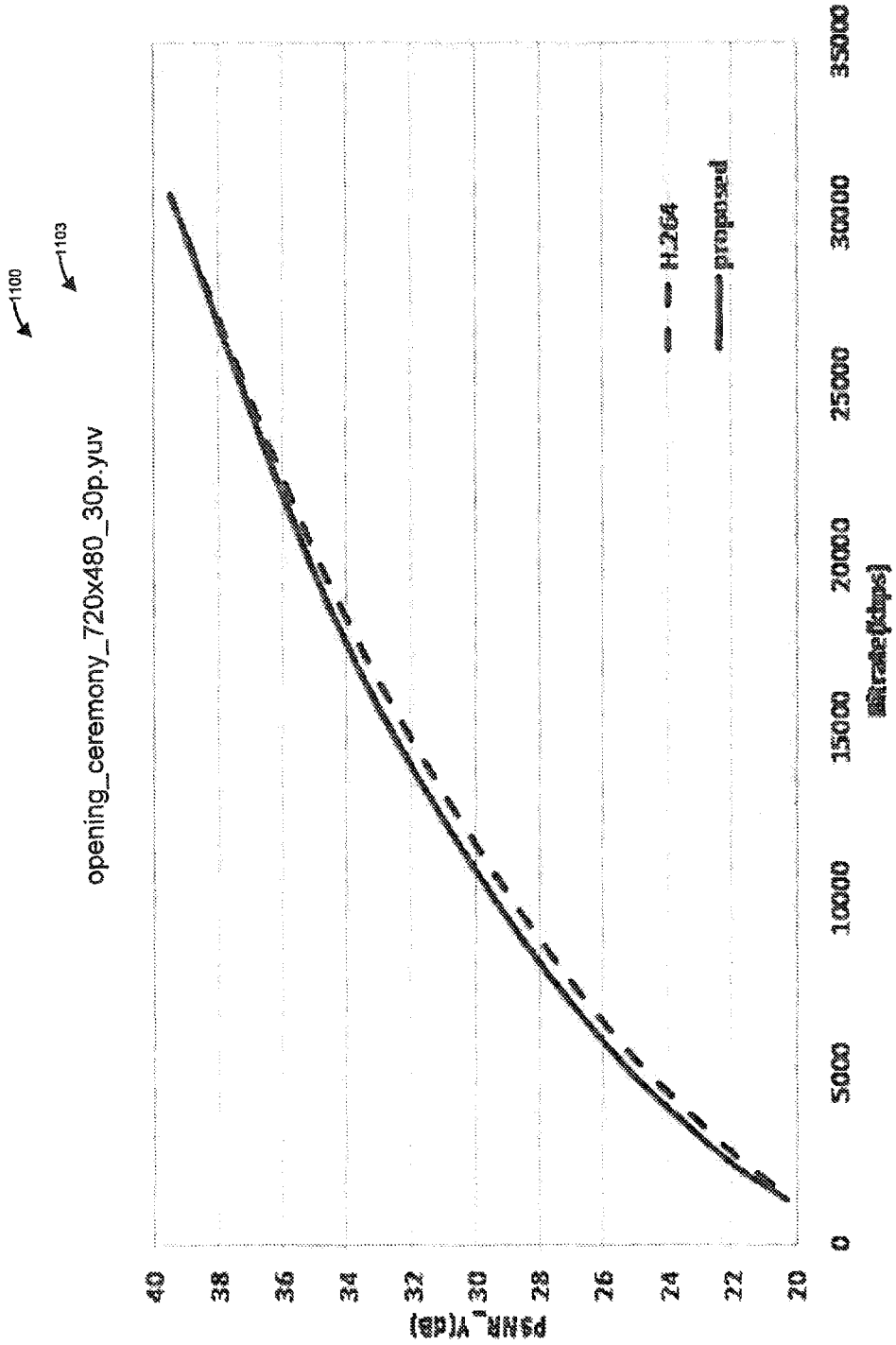

FIG. 11C corresponds to the test results 1103 for a video sequence for an OPENING CEREMONY, with the video sequence having a resolution of 720×480 and a frame rate of 30 frames per second (fps).

Figure 11D:
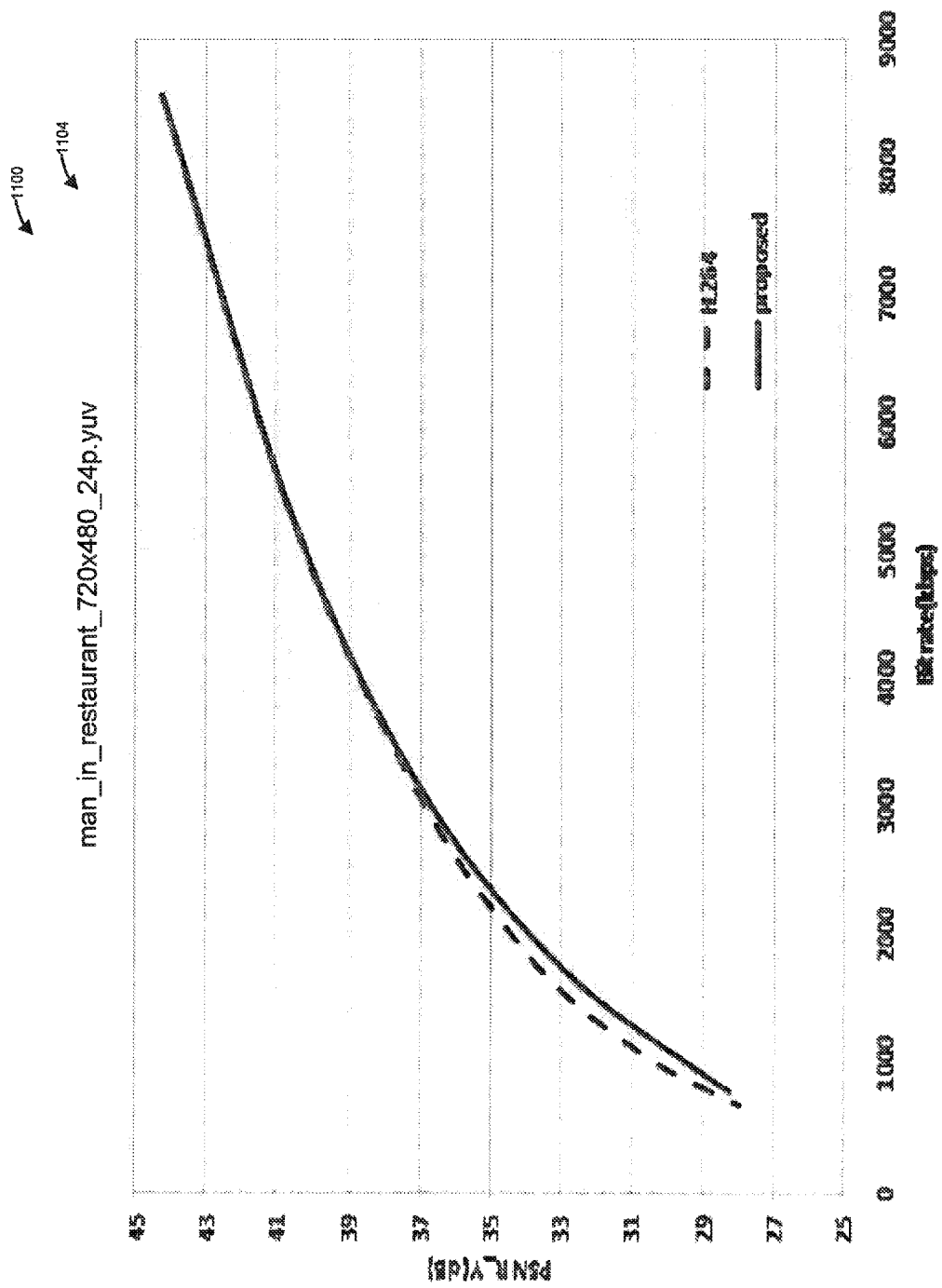

FIG. 11D corresponds to the test results 1104 for a test sequence for a MAN IN RESTAURANT, with the test sequence having a resolution of 720×480 and a frame rate of 24 frames per second (fps).

Figure 11E:
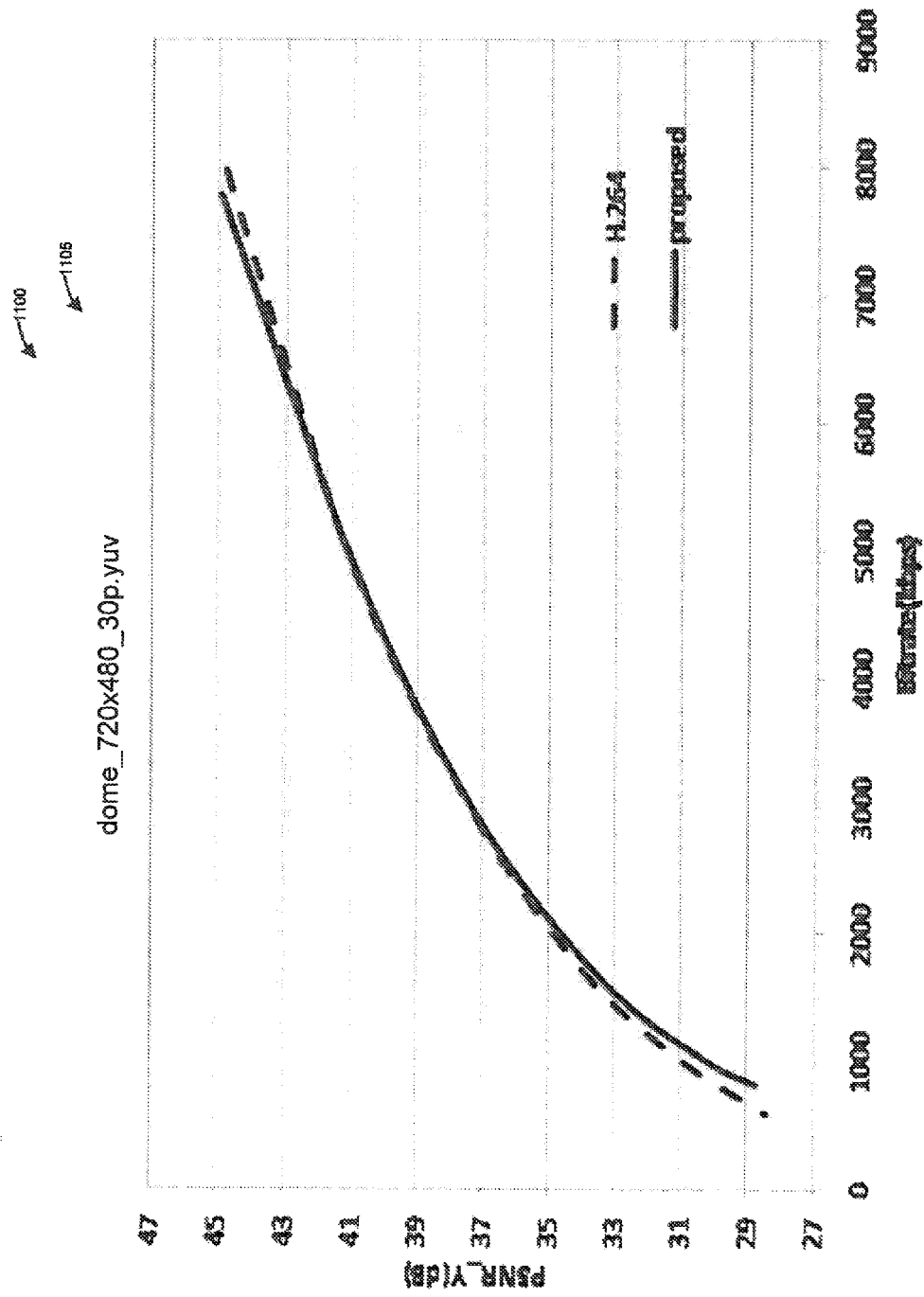

FIG. 11E corresponds to the test results 1105 for a test sequence for a DOME, with the test sequence having a resolution of 720×480 and a frame rate of 30 frames per second (fps).

Figure 11F:
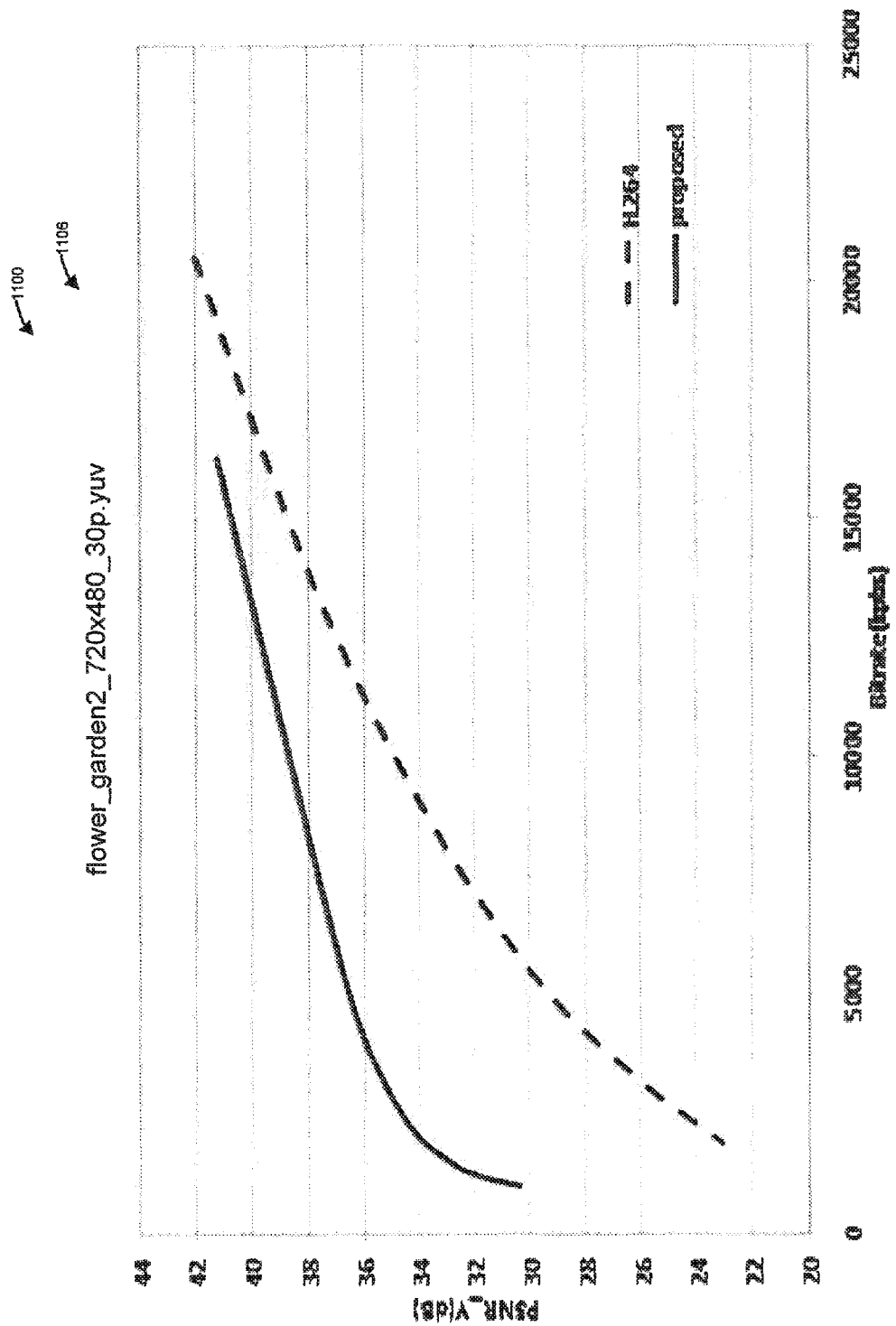

FIG. 11F corresponds to the test results 1106 for a test sequence for a FLOWER GARDEN 2, with the test sequence having a resolution of 720×480 and a frame rate of 30 frames per second (fps).

Figure 11G:
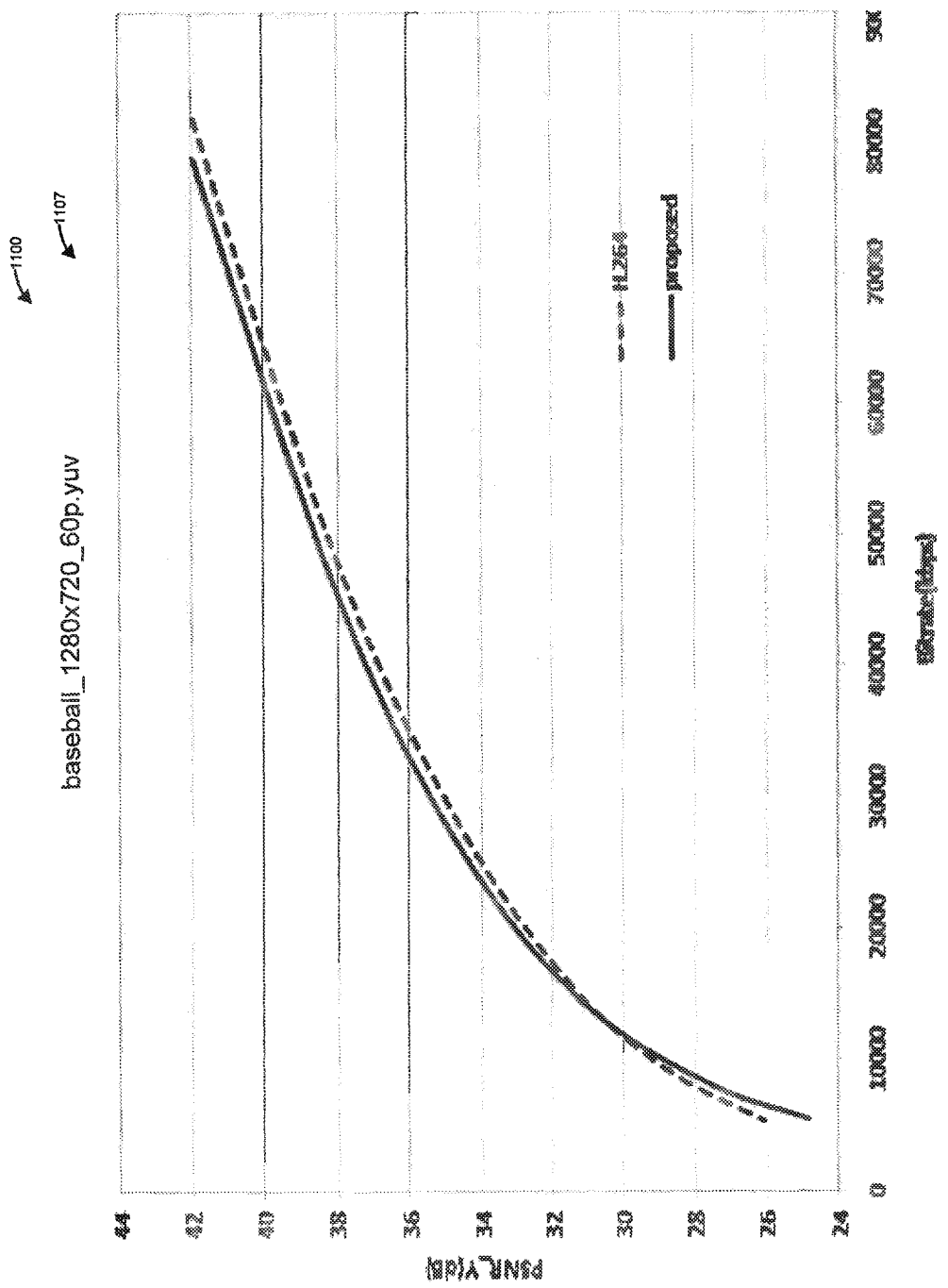

FIG. 11G corresponds to the test results 1107 for a test sequence for a BASEBALL, with the test sequence having a resolution of 1280×720 and a frame rate of 60 frames per second (fps).

Figure 11H:
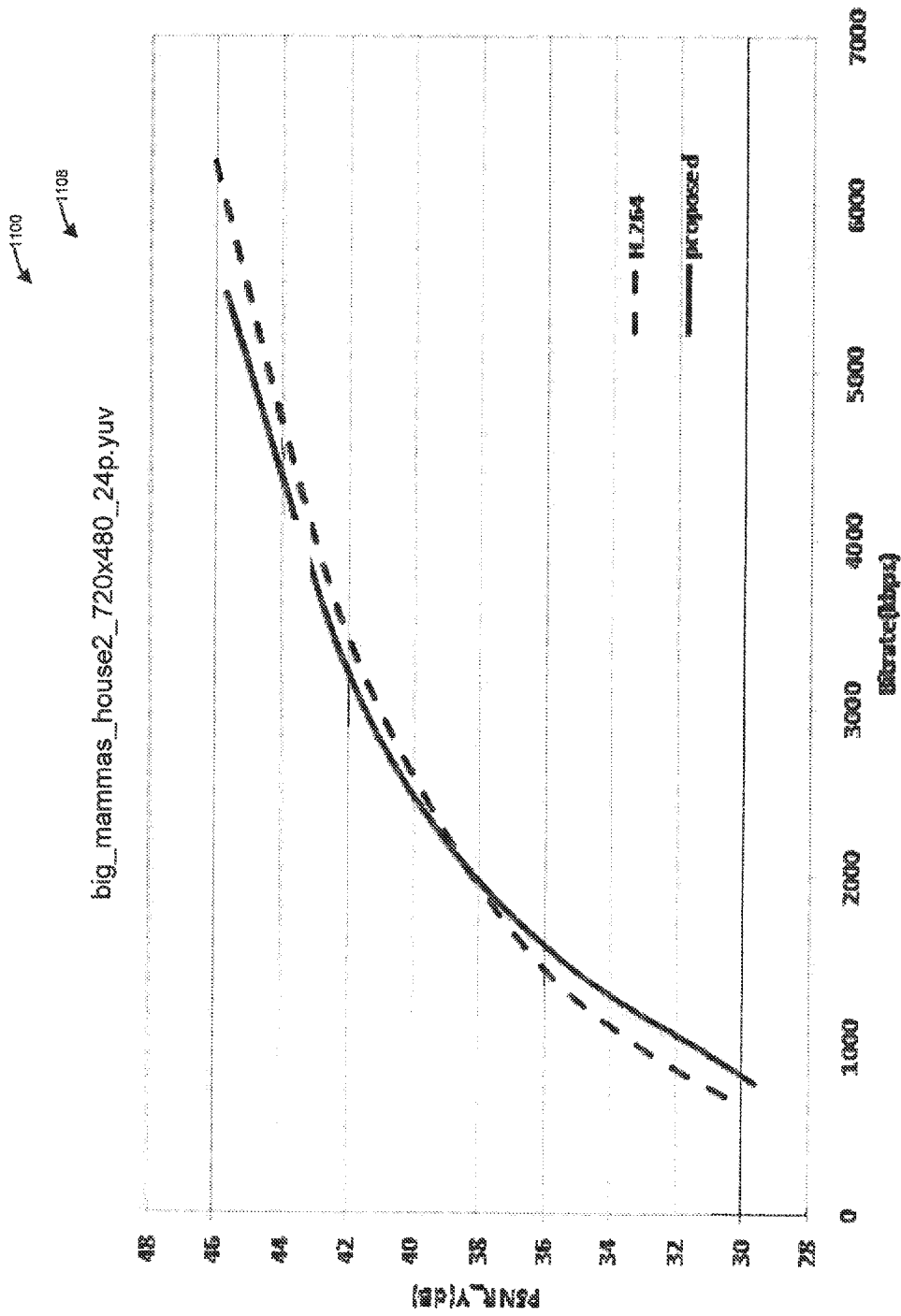
Figure 11:
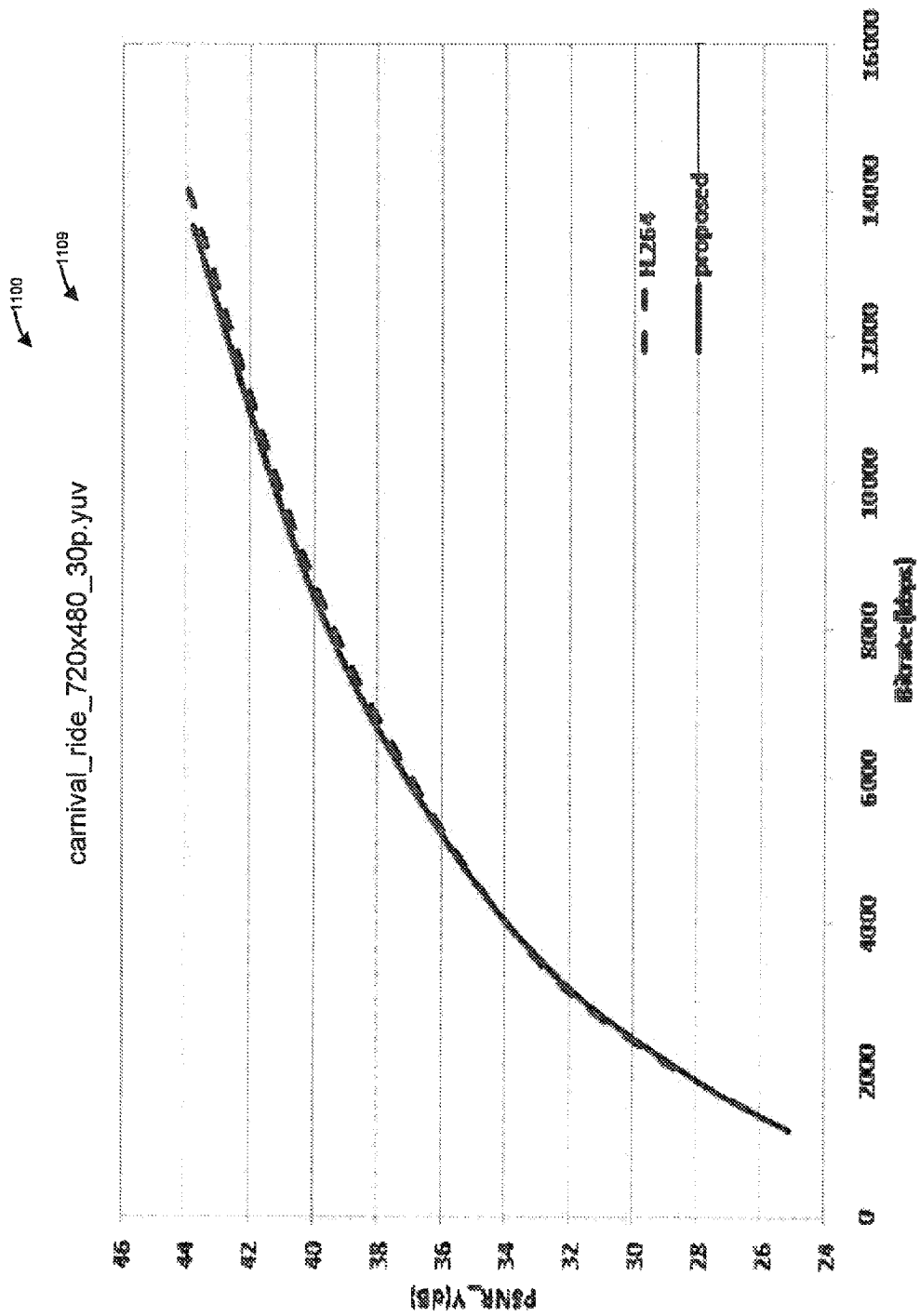

FIG. 11H corresponds to the test results 1108 for a test sequence for at least a portion of the movies BIG MOMMAS HOUSE 2, with the test sequence having a resolution of 720×480 and a frame rate of 24 frames per second (fps).

FIG. 11I corresponds to the test results 1109 for a test sequence for a CARNIVAL RIDE, with the test sequence having a resolution of 720×480 and a frame rate of 30 frames per second (fps).

Figure 11J:
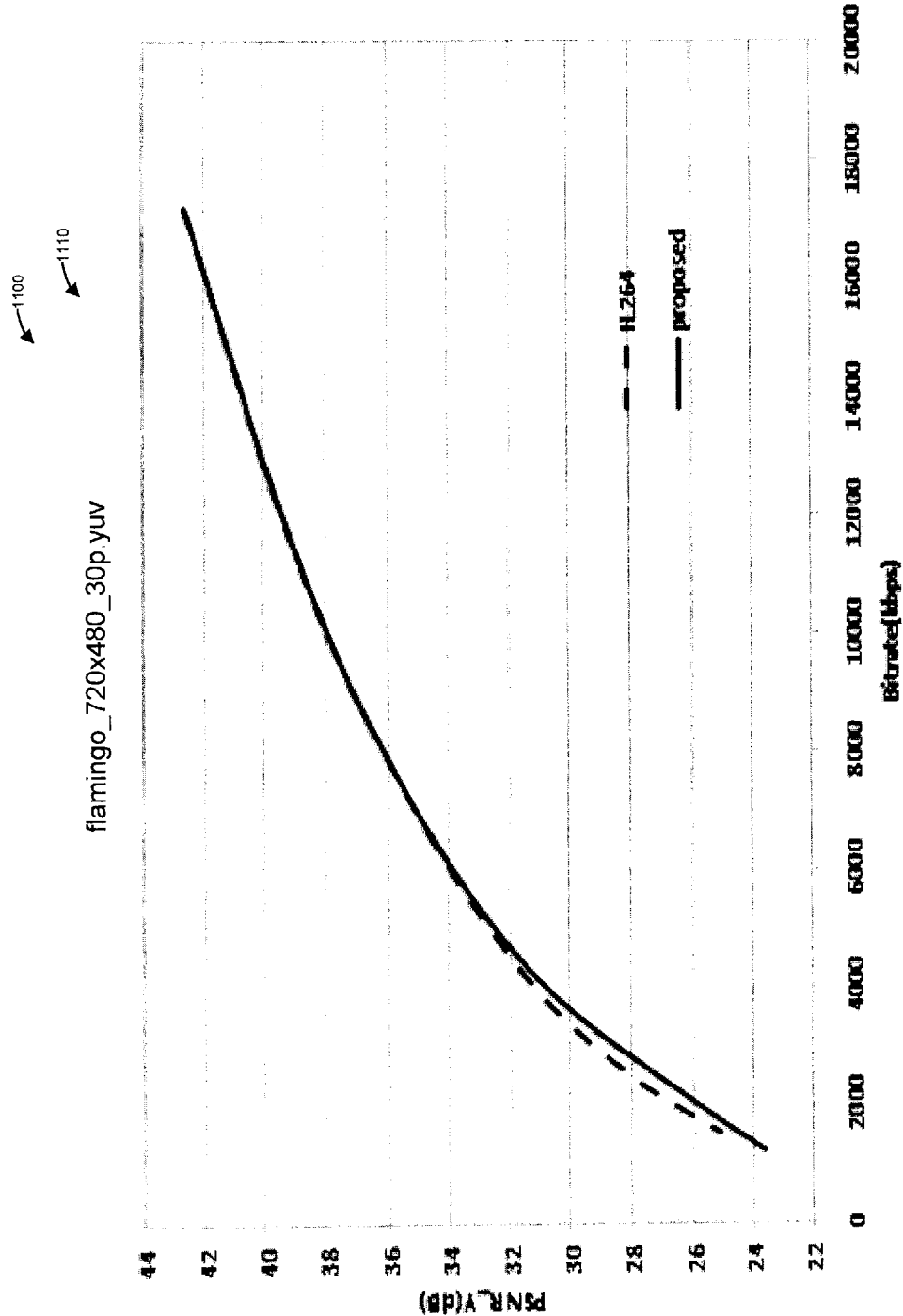

FIG. 11J corresponds to the test results 1110 for a test sequence for a FLAMINGO, with the test sequence having a resolution of 720×480 and a frame rate of 30 frames per second (fps).

Figure 11K:
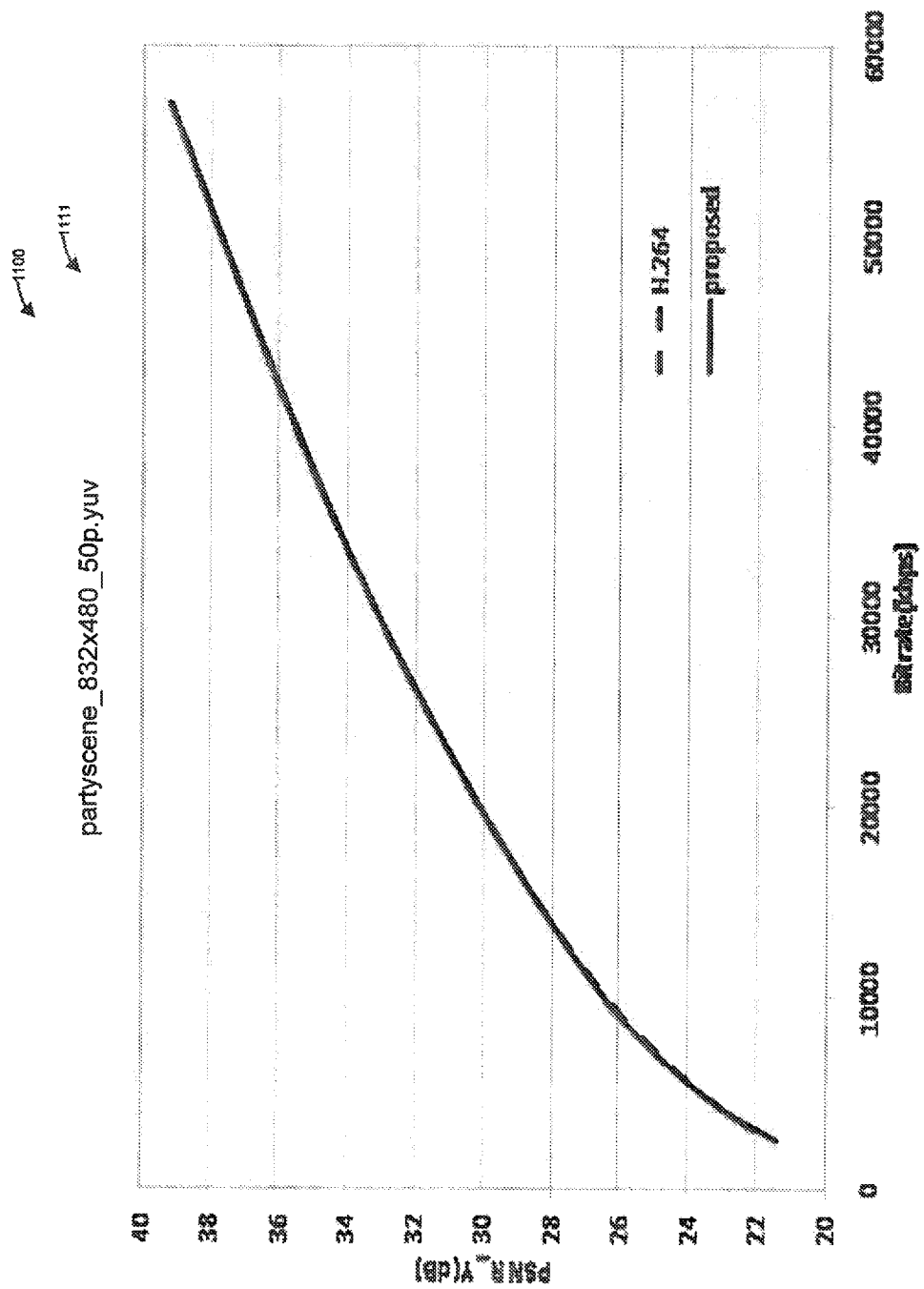

FIG. 11K corresponds to the test results 1111 for a test sequence for a PARTY SCENE, with the test sequence having a resolution of 832×480 and a frame rate of 50 frames per second (fps).

Figure 11L:
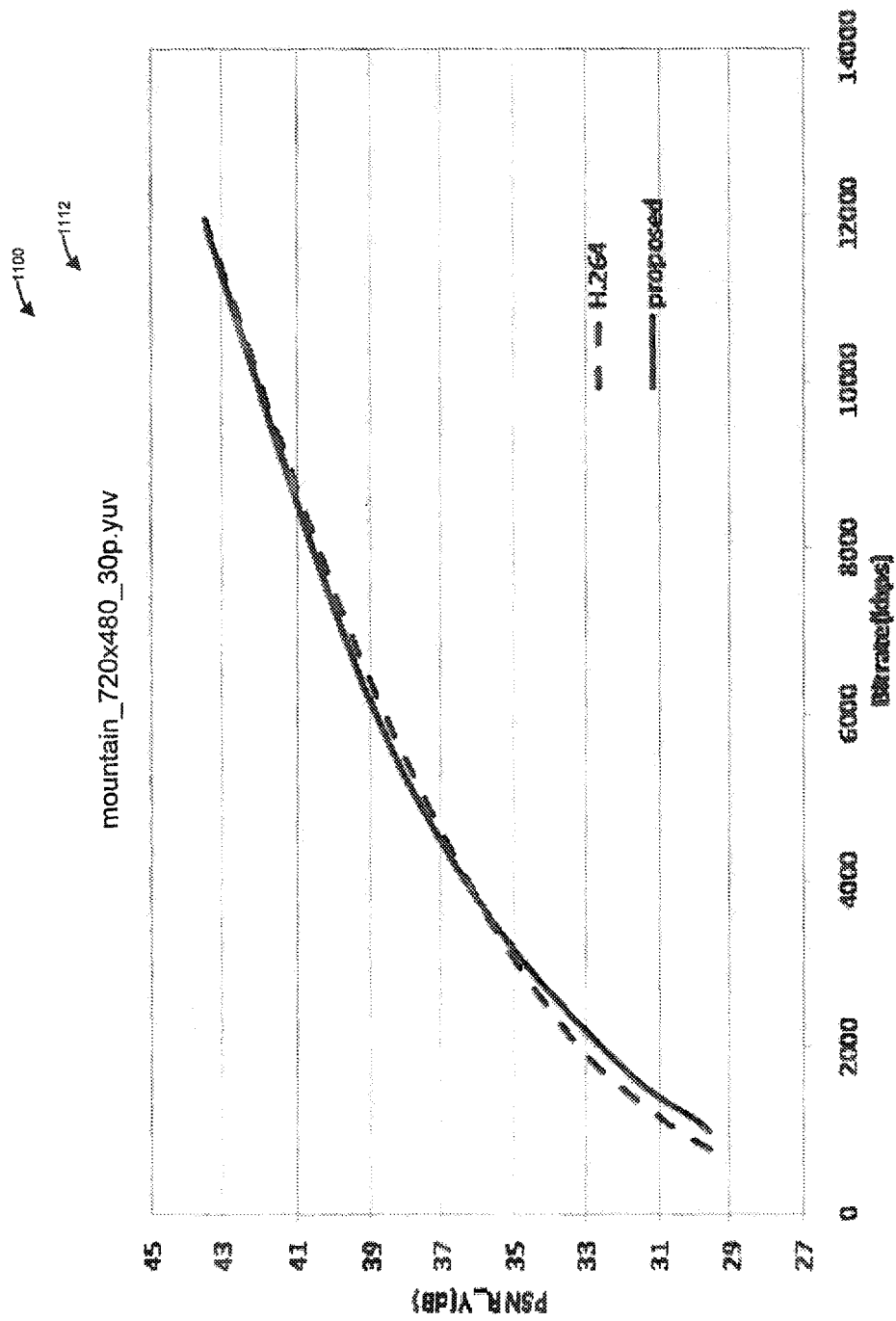

FIG. 11L corresponds to the test results 1112 for a test sequence for a MOUNTAIN, with the test sequence having a resolution of 720×480 and a frame rate of 30 frames per second (fps).

Figure 11M:
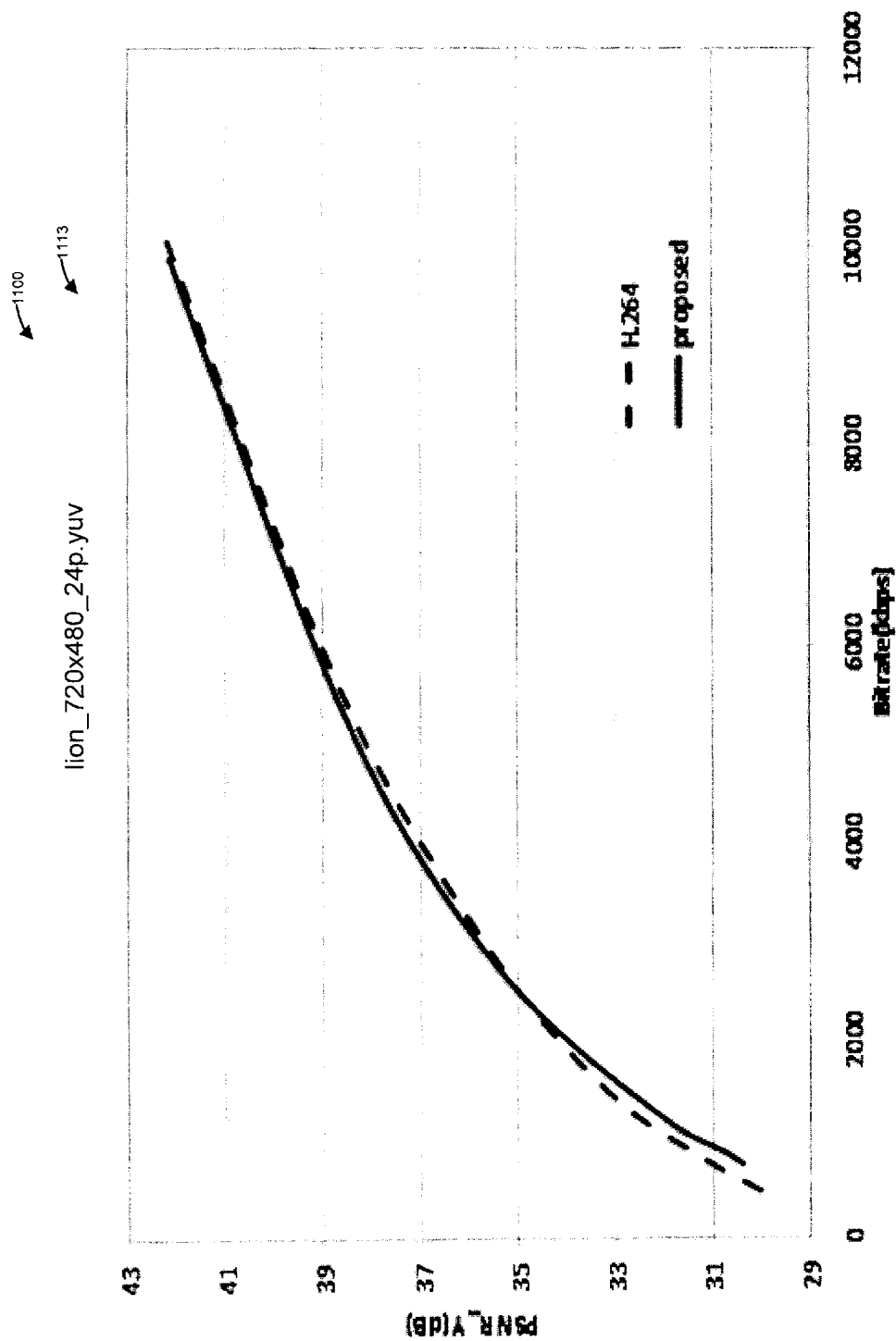
Figure 11N:
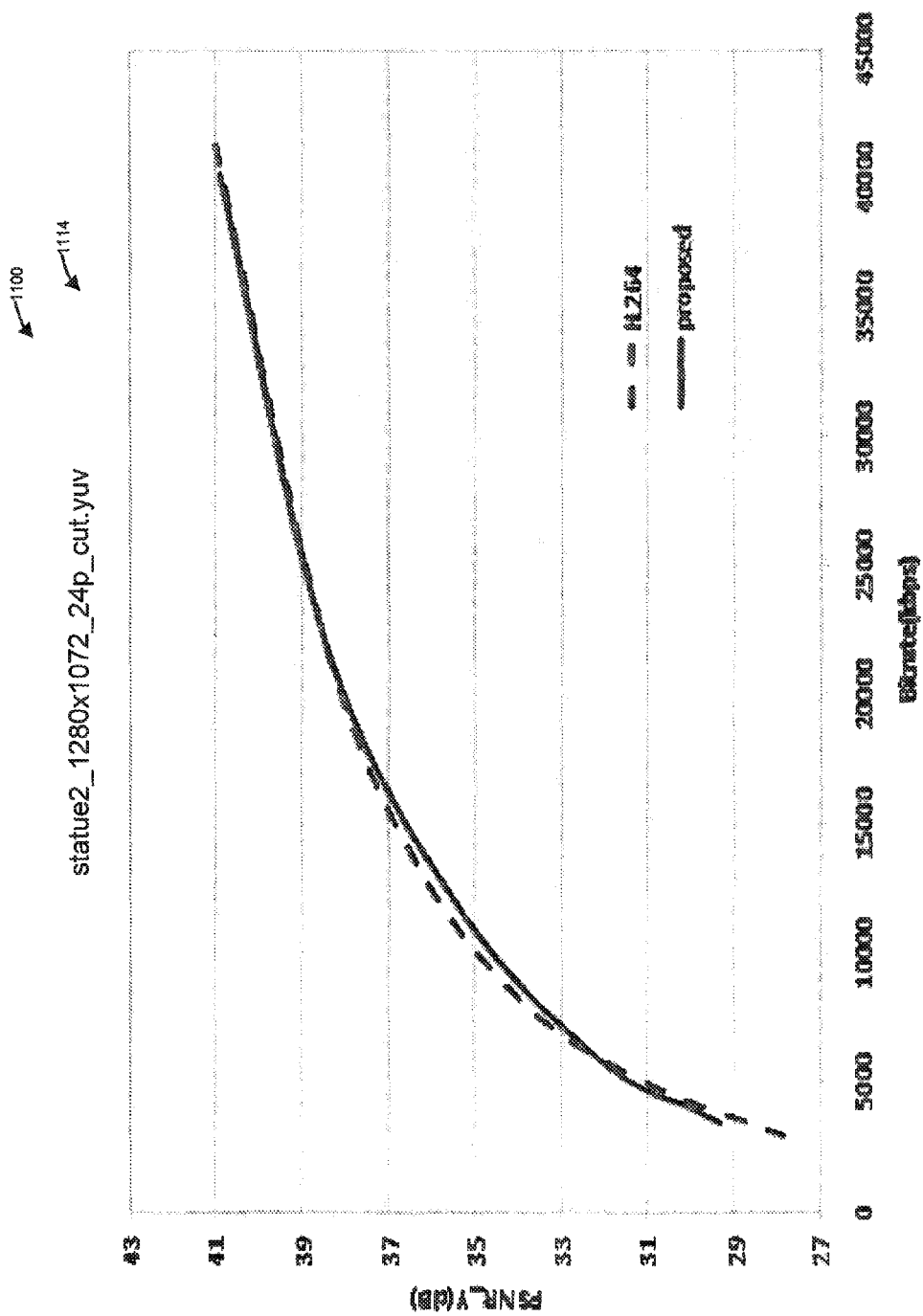

FIG. 11M corresponds to the test results 1113 for a test sequence for a LION, with the test sequence having a resolution of 720×480 and a frame rate of 24 frames per second (fps).

FIG. 11N corresponds to the test results 1114 for a test sequence for a STATUE 2, with the test sequence having a resolution of 1280×1072 and a frame rate of 24 frames per second (fps).

TABLE 2 shows the bitrate saving and PSNR gain for each of the video sequences corresponding to FIGS. 11A-N.

TABLE 2

| Sequence | Bitrate Saving (%) | PSNR Gain (dB) |
|---|---|---|
| independence_day_720 × 480_24 p | 23.05% | 1.412 |
| american_pie_720 × 480_24 p | 10.93% | 0.771 |
| opening_ceremony_720 × 480_30 p | 4.95% | 0.427 |
| man_in_restaurant_720 × 480_24 p | −2.30% | −0.171 |
| dome_720 × 480_30 p | −0.61% | −0.041 |
| flower_garden2_720 × 480_30 p | 55.18% | 4.302 |
| baseball_1280 × 720_60 p | 4.92% | 0.323 |
| big_mammas_house2_720 × 480_30 p | 3.65% | 0.244 |
| carnival_ride_720 × 480_30 p | 1.92% | 0.153 |
| flamingo_720 × 480_30 p | −0.73% | −0.058 |
| partyscene_832 × 480_50 p | 0.19% | 0.005 |
| mountain_720 × 480_30 p | 1.00% | 0.048 |
| lion_720 × 480_24 p | 1.15% | 0.058 |
| statue2_128 × 1072_24 p | −2.90% | −0.125 |
| Average | 7.17% | 0.525 |

As shown in TABLE 2, the average bitrate saving is 7.17% and PSNR gain is 0.525 dB. There are great improvements for INDEPENDENCE DAY, AMERICAN PIE, BASEBALL, OPENING CEREMONY, BIG MAMMAS HOUSE 2 and tremendous gain about 55.18% bitrate deduction for FLOWER GARDEN 2 because there are a large number of similar patches in these training frames. There are little gain and even loss at very low bitrates for MAN IN RESTAURANT, DOME, CARNIVAL RIDE, FLAMINGO, MOUNTAIN, LION, PARTY SCENE AND STATUE 2 because there is little self-similarity in these sequences.

Moreover, at very low bitrates, the bits of the metadata are comparable with the video data and, hence, the compression performance is decreased. However, the compression performance is higher or at least the same for all the test sequences at the middle or high bitrates.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus for encoding a picture in a video sequence, comprising:
   a patch library creator for creating a first patch library from an original version of said picture and a second patch library from a reconstructed version of said picture, each of said first patch library and said second patch library including a plurality of high resolution replacement patches for replacing one or more pruned blocks during a recovery of a pruned version of said picture; and
   a pruner for generating said pruned version of said picture from said first patch library, and for deciding whether to respectively replace one or more original blocks from said original version of said picture with said one or more pruned blocks responsive to a comparison between a first rate-distortion estimate and a second rate-distortion estimate, said first rate-distortion estimate and said second rate-distortion estimate being based on both a distortion component and a bitrate component;
   a metadata generator for generating metadata from said second patch library, said metadata for recovering said pruned version of said picture; and
   an encoder for encoding said pruned version of said picture and said metadata.

2. The apparatus of claim 1, wherein said pruned version of said picture is generated by dividing said original version of said picture into a plurality of blocks, and respectively replacing at least one of said plurality of blocks with a replacement patch, wherein said replacement patch comprises direct current components of said at least one of said plurality of blocks.

3. The apparatus of claim 1, wherein said first rate-distortion estimate is between a particular one of said one or more original blocks and a reconstructed version of said particular one of said one or more original blocks, said second rate-distortion estimate is between said particular one of said one or more original blocks and a best matching patch from among said plurality of high resolution patches in said first patch library, said best matching patch being determined responsive to one or more criterion.

4. The apparatus of claim 3, wherein said distortion component of said first rate-distortion estimate is calculated by determining a mean square error between said particular one of said one or more original blocks and said reconstructed version of said particular one of said one or more original blocks.

5. The apparatus of claim 3, wherein said distortion component of said second rate-distortion estimate is calculated by determining a mean square error between said particular one of said one or more original blocks and said best matching patch.

6. The apparatus of claim 3, wherein said rate component of said first rate-distortion estimate is calculated by estimating values of non-zero coefficients of a quantized residue for said particular one of said one or more original blocks as said rate component of said first rate-distortion estimate.

7. The apparatus of claim 3, wherein said rate component of said second rate-distortion estimate is calculated by entropy coding a quantized residue for said particular one of said one or more original blocks to obtain a coded bitstream, and determining a number of bits of said coded bitstream as said rate component of said second rate-distortion estimate.

8. The apparatus of claim 7, wherein said entropy coding comprises context adaptive variable length coding or context adaptive binary arithmetic coding.

9. A method for encoding a picture in a video sequence, comprising:
   creating a first patch library from an original version of said picture and a second patch library from a reconstructed version of said picture, each of said first patch library and said second patch library including a plurality of high resolution replacement patches for replacing one or more pruned blocks during a recovery of a pruned version of said picture; and
   generating said pruned version of said picture from said first patch library, and deciding whether to respectively replace one or more original blocks from said original version of said picture with said one or more pruned blocks responsive to a comparison between a first rate-distortion estimate and a second rate-distortion estimate, said first rate-distortion estimate and said second rate-distortion estimate being based on both a distortion component and a bitrate component;
   generating metadata from said second patch library, said metadata for recovering said pruned version of said picture; and
   encoding said pruned version of said picture and said metadata using an encoder.

10. The method of claim 9, wherein said pruned version of said picture is generated by dividing said original version of said picture into a plurality of blocks, and respectively replacing at least one of said plurality of blocks with a replacement patch, wherein said replacement patch comprises direct current components of said at least one of said plurality of blocks.

11. The method of claim 9, wherein said first rate-distortion estimate is between a particular one of said one or more original blocks and a reconstructed version of said particular one of said one or more original blocks, said second rate-distortion estimate is between said particular one of said one or more original blocks and a best matching patch from among said plurality of high resolution patches in said first patch library, said best matching patch being determined responsive to one or more criterion.

12. The method of claim 11, wherein said distortion component of said first rate-distortion estimate is calculated by determining a mean square error between said particular one of said one or more original blocks and said reconstructed version of said particular one of said one or more original blocks.

13. The method of claim 11, wherein said distortion component of said second rate-distortion estimate is calculated by determining a mean square error between said particular one of said one or more original blocks and said best matching patch.

14. The method of claim 11, wherein said rate component of said first rate-distortion estimate is calculated by estimating values of non-zero coefficients of a quantized residue for said particular one of said one or more original blocks as said rate component of said first rate-distortion estimate.

15. The method of claim 11, wherein said rate component of said second rate-distortion estimate is calculated by entropy coding a quantized residue for said particular of said one or more original blocks to obtain a coded bitstream, and determining a number of bits of said coded bitstream as said rate component of said second rate-distortion estimate.

16. The method of claim 15, wherein said entropy coding comprises context adaptive variable length coding or context adaptive binary arithmetic coding.

* * * * *